United States Patent
Kurihara

(10) Patent No.: US 8,085,360 B2
(45) Date of Patent: Dec. 27, 2011

(54) DISPLAY DEVICE AND PLANAR LIGHT SOURCE DEVICE

(75) Inventor: Hiroshi Kurihara, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 13/137,326

(22) Filed: Aug. 5, 2011

(65) Prior Publication Data

US 2011/0292681 A1 Dec. 1, 2011

Related U.S. Application Data

(62) Division of application No. 12/923,481, filed on Sep. 23, 2010, which is a division of application No. 11/634,262, filed on Dec. 6, 2006, now abandoned.

(30) Foreign Application Priority Data

Dec. 6, 2005 (JP) ................................. 2005-352167

(51) Int. Cl.
*G02F 1/1335* (2006.01)

(52) U.S. Cl. ........................... 349/65; 349/608; 349/97.2

(58) Field of Classification Search .................... 349/65, 349/61, 67; 362/97.1, 97.2, 621, 626, 612, 362/615, 608, 339, 623
See application file for complete search history.

(56) References Cited

U.S. PATENT DOCUMENTS

| | | | |
|---|---|---|---|
| 5,816,677 A | 10/1998 | Kurematsu et al. | |
| 6,598,987 B1 * | 7/2003 | Parikka | ............................ 362/26 |
| 6,630,968 B1 | 10/2003 | Tsuchihashi et al. | |
| 6,811,276 B2 | 11/2004 | Moon | |
| 6,906,767 B1 | 6/2005 | Iijima | |
| 7,056,001 B2 | 6/2006 | Chuang | |
| 7,108,416 B1 | 9/2006 | Osawa | |
| 7,355,661 B2 | 4/2008 | Hong | |
| 7,478,942 B2 | 1/2009 | Kim et al. | |
| 7,513,669 B2 | 4/2009 | Chua et al. | |

FOREIGN PATENT DOCUMENTS

| | | |
|---|---|---|
| CN | 1144913 A | 3/1997 |
| EP | 0 684 423 A1 | 11/1995 |
| JP | 08-152526 | 6/1996 |
| JP | 10-021720 | 1/1998 |
| JP | 2000-147429 | 5/2000 |
| JP | 2000-249837 | 9/2000 |
| JP | 2004-062004 | 2/2004 |
| JP | 2005-011599 | 1/2005 |

* cited by examiner

*Primary Examiner* — Thoi Duong
(74) *Attorney, Agent, or Firm* — Stites & Harbison PLLC; Juan Carlos A. Marquez, Esq.

(57) ABSTRACT

The present invention relates to a technique which can make a backlight used in a liquid crystal display device thin and light-weighted. The present invention provides a liquid crystal display device which includes a display panel and a backlight which is arranged behind the display panel, wherein the backlight includes a film-like light guide member, a film-like light semi-transmissive member which is adhered to a first surface of the light guide member which faces the display panel in an opposed manner, a film-like reflective member which is adhered to a back surface of the light guide member opposite to the first surface, and a spot light source which is arranged at a position of the light guide member at which light is incident on the light guide member from the first surface or the back surface, and a refractive index of the light semi-transmissive member is set smaller than a refractive index of the light guide member.

4 Claims, 17 Drawing Sheets

DISPLAY DEVICE AND PLANAR LIGHT SOURCE DEVICE

CROSS-REFERENCE TO RELATED APPLICATIONS

The present application is a Divisional application of U.S. application Ser. No. 12/923,481 filed on Sep. 23, 2010, which is a Divisional application of U.S. application Ser. No. 11/634,262 filed on Dec. 6, 2006. now abandoned Priority is claimed from U.S. application Ser. No. 12/923,481 filed on Sep. 23, 20010, which claims priority from U.S. application Ser. No. 11/634,262 filed on Dec. 6, 2006, which claims priority from Japanese application 2005-352167 filed on Dec. 6, 2005, the content of which is hereby incorporated by reference into this application.

BACKGROUND OF THE INVENTION

1. Field of the Invention

The present invention relates to a display device and a planar light source device, and more particularly to a technique which is effectively applicable to a planar light source device which radiates light propagated through a light guide plate and a display device which uses the planar light source device.

2. Description of the Related Arts

Conventionally, as a display of a mobile phone or a notebook-type PC (Personal Computer) or the like, a liquid crystal display device (a liquid crystal display unit) having a liquid crystal display panel is used.

The liquid crystal display device is roughly classified into a transmissive-type liquid crystal display device which displays an image (a video) by arranging a backlight (a light source) behind the liquid crystal display panel and radiating light from the light source to the liquid crystal display panel and allowing the light to pass through the liquid crystal display panel, and a reflective-type liquid crystal display device which displays an image (a video) by reflecting light from outside a display device on a liquid crystal display panel.

Further, the backlight of the transmissive-type liquid crystal display device is roughly classified into, for example, a direct-type backlight which arranges a light source such as a fluorescent tube in a region which is overlapped to a display region of a liquid crystal display panel, and an edge-light-type (also referred to as a side-light-type) backlight which arranges a light guide plate in a region which is overlapped to a display region of a liquid crystal display panel and arranges a light source on an end portion of the light guide plate.

The edge-light-type backlight is a backlight which radiates light to the liquid crystal display panel by propagating light from the light source which is arranged on the end portion of the light guide plate in the inside of the light guide plate, directing the light in the direction toward the liquid crystal display panel by a reflective portion formed on a back surface of the light guide plate and by diffusing the light using a diffusion plate. The edge-light-type backlight can reduce a thickness thereof compared to a thickness of the direct-type backlight. Accordingly, the liquid crystal display device having the edge-light-type backlight has been often used in a display of a mobile phone or a notebook-type PC.

Further, with respect to the edge-light-type backlight, to uniformly radiate light to the display region of the liquid crystal display panel, there has been known a backlight which uses a combination of a light guide plate to which a shape which efficiently reflects the propagating light (for example, grooves) is applied and a reflective sheet (for example, see Japanese Patent Laid-open No. 11599/2005 (patent document 1)).

Further, with respect to the edge-light-type backlight, to achieve the reduction of thickness of the backlight, for example, there has been known a backlight which is constituted of a light guide body layer (a light guide plate), a reflection layer (a reflective portion) and a diffusion layer (a diffusion plate) as the integral structure, wherein each layer is formed of a thin film sheet (for example, see Japanese Patent Laid-open Hei08-152526 (patent document 2)).

SUMMARY OF THE INVENTION

However, for example, in the backlight described in the above-mentioned patent document 1, the reflection grooves or the like are formed in the light guide plate and hence, a gap is defined between the reflective sheets and light infiltrates into the gap. Further, due to the formation of the grooves, there exists light which reflects or refracts at an angle which does not contribute to the front face brightness. Accordingly, there has been a drawback that loss of light is increased. Further, in general, the light guide plate is often formed by injection molding and hence, there has been a drawback that it is difficult to form the light guide plate into a shape as designed from a viewpoint of forming accuracy.

Further, for example, the backlight described in the above-mentioned patent document 2 makes use of the generation of a total reflection on an interface between the sheets by combining thin film sheets having different refractive indexes. However, no consideration has been taken by the patent document 2 with respect to an incident angle of light when the light is incident on the light guide body layer from the light source. Accordingly, for example, the light which is incident on the light guide plate at a small incident angle which does not generate the total reflection becomes dominant thus giving rise to a drawback that light cannot be effectively radiated into the inside of a display region of the liquid crystal display panel.

Further, in the liquid crystal display device (the liquid crystal display unit) which is used in a mobile phone or the like, recently, to achieve the reduction of weight of the liquid crystal display device, for example, a spot light source such as an LED (Light Emitting Diode) is used as the light source of the backlight. However, the backlight described in the patent document 2 premises the use of a linear light source such as a fluorescent tube as the light source. Accordingly, for example, when the spot light source such as the LED is used, there has been a drawback that it is difficult to make the brightness distribution of the light which is radiated into the inside of the display region of the liquid crystal display panel.

Accordingly, it is an object of the present invention to provide a technique which can achieve the reduction of thickness and the reduction of weight of a backlight used in a liquid crystal display device, for example.

It is another object of the present invention to provide a technique which can achieve the reduction of thickness, the reduction of weight of a backlight used in a liquid crystal display device, and the increase of brightness of the liquid crystal display device, for example.

The above-mentioned and other objects and novel features of the present invention will become apparent from the description of this specification and attached drawings.

To explain the summary of typical inventions among the inventions disclosed in this specification, they are as follows.

(1) In a display device which includes a display panel and a backlight which is arranged behind the display panel, the backlight includes a film-like light guide member, a film-like light semi-transmissive member which is adhered to a first surface of the light guide member which faces the display panel in an opposed manner, a film-like reflective member which is adhered to a back surface of the light guide member opposite to the first surface, and a spot light source which is arranged at a position of the light guide member at which light is incident on the light guide member from the first surface or the back surface, wherein a refractive index of the light semi-transmissive member is set smaller than a refractive index of the light guide member.

(2) In a display device which includes a display panel and a backlight which is arranged behind the display panel, the display panel adheres a polarizer on a surface thereof which faces the backlight in an opposed manner and a back surface thereof opposite to the surface, and the backlight includes a film-like light guide member, a film-like polarization reflective member which is adhered to a first surface of the light guide member which faces the display panel in an opposed manner, a film-like reflective member which is adhered to a back surface of the light guide member opposite to the first surface, and a spot light source which is arranged at a position of the light guide member at which light is incident on the light guide member from the first surface or the back surface, wherein a transmission axis of the polarization reflective member is directed in the same direction as a transmission axis of the polarizer which is adhered to the surface of the display panel which faces the backlight in an opposed manner.

(3) In the display device having the above-mentioned means (1) or (2), the backlight includes a reflector which is arranged in the direction that the spot light source radiates the light in the film surface direction of the light guide member and allows the light radiated from the spot light source to be incident on the light guide member by reflecting the light.

(4) In the display device having the above-mentioned means (1) or (2), the light semi-transmissive member or the polarization reflective member changes a ratio of transmissivity and reflectance of light which propagates in the light guide member corresponding to a distance from a position at which the light of the light guide member is incident.

(5) In the display device having the above-mentioned means (1) or (2), a plurality of through holes are formed in a plurality of portions of the light semi-transmissive member or the polarization reflective member, and the distribution density of the through holes is changed corresponding to a distance from a position at which the light of the light guide member is incident.

(6) In the display device having the above-mentioned means (1) or (2), the reflective member changes reflectance thereof corresponding to a distance from a position at which the light of the light guide member is incident.

(7) In the display device having the above-mentioned means (1) or (2), the reflective member has an irregular reflection pattern formed of a concave shape or a convex shape at a plurality of portions of a surface of the reflective member which is brought into close contact with the light guide member, and the distribution density of the irregular reflection pattern is changed corresponding to a distance from a position at which the light of the light guide member is incident.

(8) In a planar light source device having a light source and a film-like light guide member, the light source includes a film-like incident-light adjusting member which is arranged in the direction that light is radiated in the direction perpendicular to a film surface of the light guide member and changes the incident direction of light to the light guide member to the propagation direction of light of the light guide member between a region of the light guide member which allows light to be incident thereon and a surface of the light source from which light is radiated, and the incident-light adjusting member has one, two or more projections on a surface side thereof which faces the light guide member in an opposed manner, and distal end surfaces of the projections are brought into close contact with the light guide member.

(9) In the planar light source device having the above-mentioned means (8), a light radiation surface of the light guide member has a radiation light adjusting member which adjusts a radiation angle of the light from the light radiation surface.

(10) In the planar light source device having the above-mentioned means (8) or (9), the light guide member includes a reflective member on aback surface thereof opposite to a surface thereof on which the incident-light adjusting member is arranged and in a region thereof which is overlapped to the incident-light adjusting member.

(11) In any one of the planar light source devices having the above-mentioned means (8) to (10), the projections of the incident-light adjusting member are columnar projections each of which has a curved bottom surface.

(12) In a display device which includes a display panel and a backlight which is arranged behind the display panel, the backlight is formed of the planar light source device included in any one of the planar light source devices having the above-mentioned means (8) to (11).

The display device of the present invention adopts the constitution in which the portion which propagates the light of the backlight is integrally configured such that, as shown in the above-mentioned means (1), the film-like light guide member is sandwiched between the film-like light semi-transmissive member and the film-like reflective member. Here, each member is integrally formed by adhering film-like formed members having a thickness of 0.25 mm or less to each other, for example. Due to such a constitution, the light guide plate can be made thin and light-weighted. Further, by adopting the integral constitution formed of a film-like light guide member, a semi-transmissive member and a reflective member, light which is incident on the light guide member propagates through the light guide member while repeating the reflection between the semi-transmissive member and the reflective member with high efficiency. Accordingly, loss of the light which propagates through the light guide member is decreased thus increasing the brightness of the light radiated to the display region of the display panel.

Further, in the display device of the present invention, the constitution of the portion which propagates the light of the backlight may adopt a film-like polarization reflective member in place of the semi-transmissive member as in the case of the above-mentioned means (2).

Here, by adopting the above-mentioned constitution of the means (3), the loss of light can be reduced and hence, the brightness of light which is radiated to the display region of the display panel can be increased. Here, it is preferable that the above-mentioned reflector has a reflective surface having a convex shape in the direction toward the spot light source, for example.

Further, by constituting the light semi-transmissive member or the polarization reflective member as in the case of the above-mentioned means (4), it is possible to make the in-plane brightness of the light radiated to the display region of the display panel uniform. Here, in place of changing the ratio between the transmissivity and the reflectance of the light semi-transmissive member or the polarization reflective member as in the case of the above-mentioned means (4), a plurality of through holes may be formed in the light semi-transmissive member or the polarization reflective member by changing the distribution density of the through holes as in the case of the above-mentioned means (5).

Further, in place of changing the ratio between the transmissivity and the reflectance of the light semi-transmissive member or the polarization reflective member as in the case of the above-mentioned means (4), the reflectance of the reflective member may be changed as in the case of the above-mentioned means (6). Here, in place of changing the reflectance of the reflective member as in the case of the above-mentioned means (6), a plurality of irregular reflection patterns may be provided to a surface of the reflective member which is laminated to the light guide member while changing the distribution density of the irregular reflection patterns as in the case of the above-mentioned means (7).

Further, when the light radiated from the spot light source is directed toward the film surface of the light guide member as in the case of the above-mentioned means (3), even when the light is reflected on the reflector, there may be a case that among the light which is incident on the light guide member, the light whose incident angle does not exceed a critical angle becomes dominant. With respect to the light which is incident with the angle which does not exceed the critical angle and propagates through the light guide member, there is no possibility that such a light is totally reflected on an interface with the light semi-transmissive member or the polarization reflective member or an interface with the reflective member. Accordingly, the light leaks to the outside of the light guide member on each interface, and the light does not propagate through the inside of the light guide member.

To overcome such a drawback, for example, as in the case of the above-mentioned means (8), it is desirable to use the planar light source device which is arranged to radiate the light in the direction perpendicular to the film surface of the light guide member as the spot light source. Here, the above-mentioned incident light adjusting member may be arranged between the spot light source and the light guide member. Due to such a constitution, the light of the spot light source which is radiated in the direction perpendicular to the film surface of the light guide member is allowed to be incident on the light guide member while converting the incident angle thereof into an angle which exceeds the critical angle in the inside of the light guide member using the incident light adjusting member. Accordingly, it is possible to allow the light of the spot light source to be effectively incident on the light guide member thus acquiring the higher brightness uniformity.

Further, for example, as in the case of the above-mentioned means (9), the radiation light adjusting member which adjusts the radiation angle of the light from the radiation surface may be provided to the radiation surface of light of the light guide member. The radiation light adjusting member may be constituted in the same manner as the above-mentioned incident light adjusting member, for example. Due to such a constitution, for example, even when the light guide member is not sandwiched between the light semi-transmissive member and the reflective member, it is possible to radiate the light which is incident on the light guide member in a planar shape while propagating the light through the light guide member.

Further, by providing the reflective member as in the case of the above-mentioned means (10), it is possible to allow the light which is radiated to the outside of light guide member to be reflected on the above-mentioned reflective portion without making the incident angle exceed the critical angle using the incident light adjusting member thus allowing the light to be incident on the light guide member again.

Here, by adopting the constitution of the means (11), it is possible to propagate the light of the spot light source in a spreading manner in the inside of the light guide member.

In this manner, with the provision of the planer light source device having any one of the above-mentioned means (8) to means (11), it is possible to allow the light of the spot light source to be effectively incident on and to propagate through the light guide member thus acquiring the high brightness uniformity. Further, by forming the light guide member, the incident light adjusting member and the radiation light adjusting member in a film shape, it is possible to realize the reduction of thickness and the reduction of the weight of the planar light source device. Accordingly, as in the case of the above-mentioned means (12), with the use of the planar light source device having the any one of the above-mentioned means (8) to means (11) as the backlight of the display device, it is possible to realize the reduction of thickness and the reduction of weight of the backlight and, at the same time, the brightness uniformity of the display region can be enhanced.

DETAILED DESCRIPTION OF THE INVENTION

Hereinafter, the present invention is explained in detail in conjunction with embodiments by reference to drawings.

Here, with respect to the whole drawings for explaining the embodiments, parts having the same functions are given the same symbols and their repeated explanation is omitted.

Embodiment 1

Figure 1:
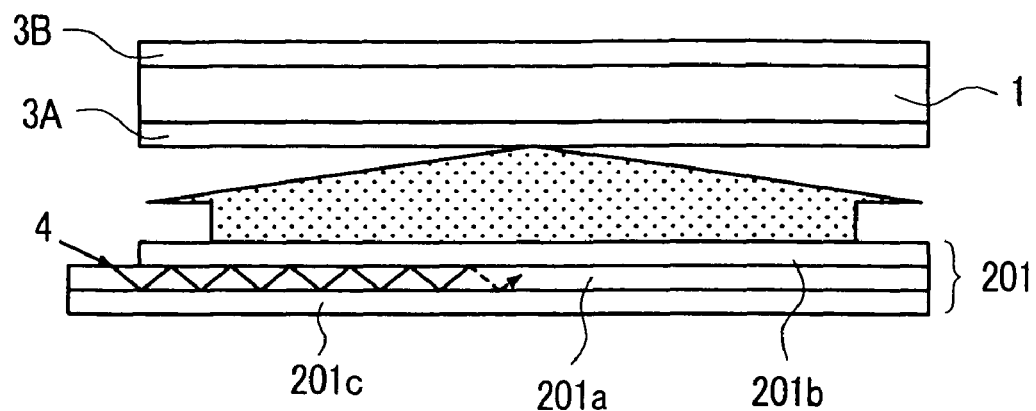
FIG. 1 is a schematic view showing the schematic constitution of a display device of an embodiment 1 according to the present invention.
Figure 2:
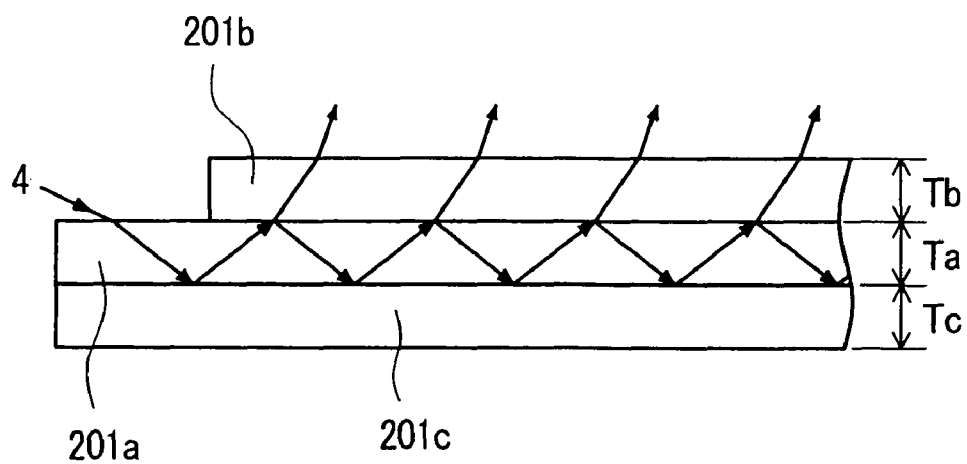
FIG. 2 is an enlarged schematic view of an essential part of FIG. 1.

FIG. 1 is a schematic view showing the schematic constitution of a display device of an embodiment 1 according to the present invention, while FIG. 2 is an enlarged schematic view showing an essential part of FIG. 1.

In FIG. 1, numeral 1 indicates a display panel, numeral 201 indicates a light radiation portion, numeral 201a indicates a light guide member (a light guide film), numeral 201b indicates a light semi-transmissive member (a light semi-transmissive film), numeral 201c indicates a reflective member (a reflective film), and numerals 3A, 3B indicate polarizer films.

The display device of this embodiment 1 includes, for example, as shown in FIG. 1, the light radiation portion 201 of a backlight below the display panel 1.

The display panel 1 may be any kind of display panel provided that the display panel 1 allows light radiated from the light radiation portion 201 of the backlight to pass therethrough and displays an image (a video). As one example of the display panel 1, for example, a liquid crystal display panel in which a liquid crystal material is sandwiched between a pair of substrates may be named. Further, in the display panel 1, in general, as shown in FIG. 1, polarizer films 3A, 3B are adhered to a surface of the display panel 1 on which light radiated from the backlight is incident and a surface of the display panel 1 from which light is radiated respectively.

The light radiation portion 201 of the backlight is, for example, as shown in FIG. 1 and FIG. 2, integrally configured such that the light guide member 201a is sandwiched between the light semi-transmissive member 201b and the reflective member 201c. Here, the light semi-transmissive member 201b is made of a material having a refractive index smaller than a refractive index of the light guide member 201a.

Further, in the embodiment 1, the light guide member 201a, the light semi-transmissive member 201b and the reflective member 201c are respectively formed of a film-like member. Hereinafter, the light guide member 201a is referred to as a light guide film, the light semi-transmissive member 201b is referred to as a light semi-transmissive film and the reflective member 201c is referred to as a reflective film. Here, a thickness Ta of the light guide film 201a is set to 0.25 mm or less, for example. Further, a thickness Tb of the light semi-transmissive film 201b and a thickness Tc of the reflective film 201c are respectively set to 0.05 mm or less, for example.

The light guide film 201a is made of polycarbonate (PC) having a refractive index of 1.59, for example, while the light semi-transmissive film 201b is made of fluororesin having a refractive index of 1.35, for example. Here, the light semi-transmissive film 201b may be also made of polyethylene terephthalate (PET) having a refractive index of 1.57 or an acrylic UV curing resin having a refractive index of 1.49, for example. Further, the reflective film 201c is formed of a polyester multi-layered film or a silver sheet which is prepared by sputtering silver to a PET substrate.

Further, in the embodiment 1, the light guide member 201a, the light semi-transmissive member 201b and the reflective member 201c are formed into the integral structure by adhering them to each other using an optical adhesive agent having a refractive index which is substantially equal to a refractive index of the light semi-transmissive member 201b, for example.

In the display device having such a constitution, for example, as shown in FIG. 1 and FIG. 2, light 4 is incident on the light radiation portion 201 of the backlight from an end portion of a surface of the light guide film 201a which faces the display panel 1 in an opposed manner (hereinafter, referred to as a film surface). Then, the incident light 4 is propagated in the inside of the light guide film while repeating the reflection between an interface with the light semi-transmissive film 201b and an interface with the reflective film 201c. Here, on the interface with the light semi-transmissive film 201b, corresponding to the relationship between a refractive index of the light guide film 201a and a refractive index of the light semi-transmissive film 201b, light having a shallow angle, that is, light having a large incident angle with respect to the light semi-transmissive film 201b is reflected on the interface. On the other hand, light having a deep angle, that is, light having a small incident angle with respect to the light semi-transmissive film 201b is refracted on the interface and is radiated in the direction toward the display panel 1. The light which is reflected on the interface with the light semi-transmissive film 201b is reflected on the interface with the reflective film 201c and, again, is incident on the interface with the light semi-transmissive film 201b. By allowing the light which propagates through the light guide film 201a to repeat this operation, the light 4 incident on the light guide film 201a is converted into a planar light and is radiated to the display panel 1.

Here, although not shown in FIG. 1 and FIG. 2, a light source of the light 4 which is incident on the light guide film 201a may be arranged at any position provided that the light 4 which is incident on the light guide film 201a propagates in the direction toward a region which is overlapped to the display panel 1 from the light incident position.

In this manner, in the display device according to the embodiment 1, the thickness Ta of the light guide film 201a is set to 0.25 mm or less and the thickness Tb of the light semi-transmissive film 201b and the thickness Tc of the reflective film 201c are respectively set to 0.05 mm or less. Accordingly, a total thickness of the thickness Ta of the light guide film 201a, the thickness Tb of the light semi-transmissive film 201b and the thickness Tc of the reflective film 201c can be, as a matter of course, set to a value larger than 0 and equal to or less than 0.35 mm. Further, by forming these films into the integral structure, the light radiation portion 201 of the backlight can be made thin and light-weighted.

Further, by forming the light guide film 201a, the light semi-transmissive film 201b and the reflective film 201c into the integral structure, it is possible to propagate the light 4 which is incident on the light guide film 201a by repeating the reflection of the light 4 with high efficiency on the interface with the light semi-transmissive film 201b and the interface with the reflective film 201c. Accordingly, loss of light attributed to leaking of light on respective interfaces, particularly, on the interface with the reflective film 201c can be reduced and hence, it is possible to increase the brightness of light which is radiated to the display panel 1.

Figure 3:
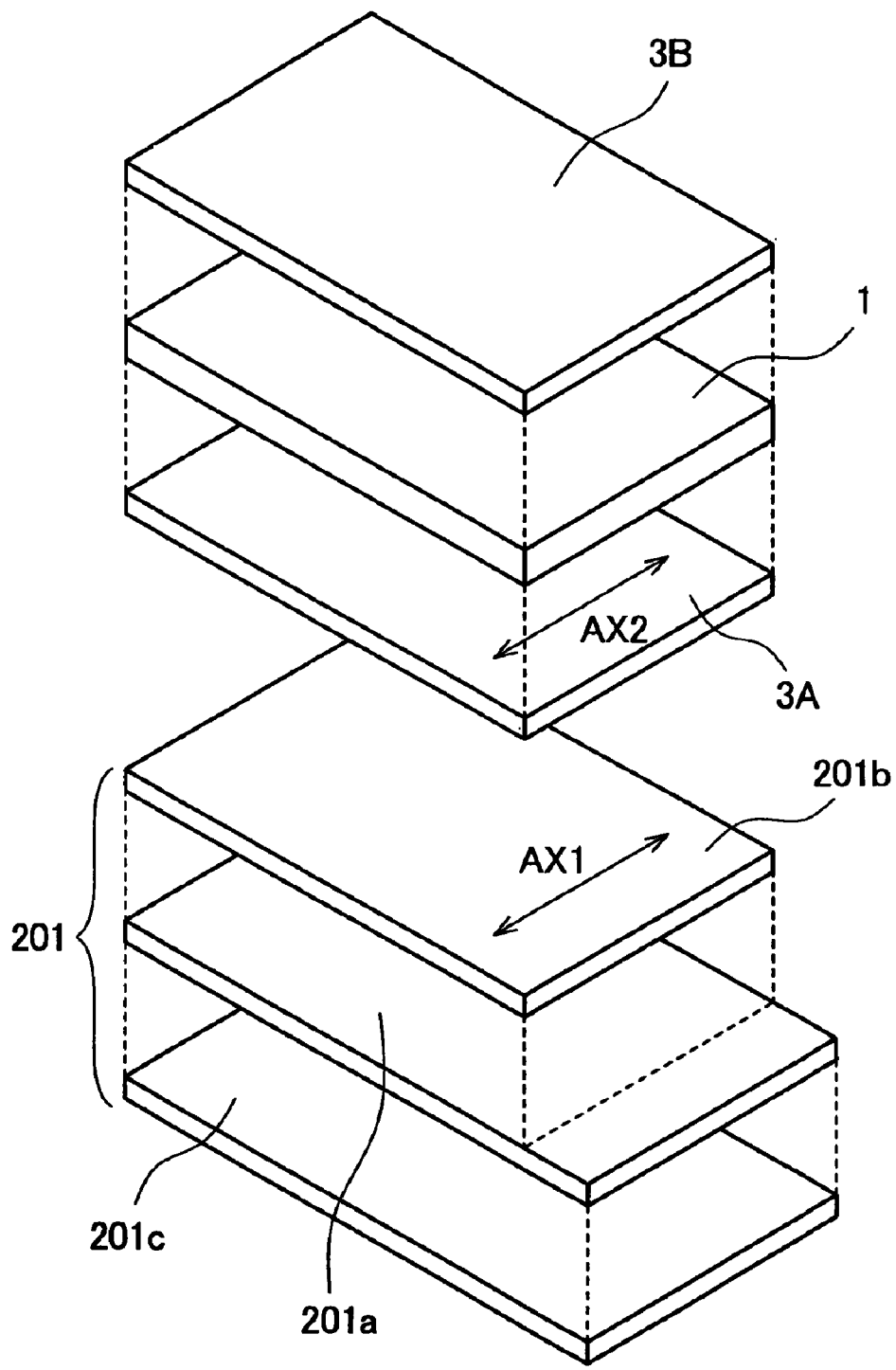
FIG. 3 is a schematic view for explaining a modification of the embodiment 1.

FIG. 3 is a schematic view for explaining a modification of the embodiment 1.

In the display device of the embodiment 1, by forming the light guide film 201a, the light semi-transmissive film 201b and the reflective film 201c into the integral structure, the light 4 which is incident on the light guide film 201a is propagated while repeating the reflection of light with high efficiency between the interface with the light semi-transmissive film 201b and the interface with the reflective film 201c. Here, the light semi-transmissive film 201b is a member which reflects or refracts the light (allows the light to pass through) corresponding to an incident angle of the light which is propagated through the light guide film 201a and is incident on the interface with the light semi-transmissive film 201b. That is, on the interface between the light guide film 201a and the light semi-transmissive film 201b, a portion of the light which is incident on the interface is reflected and is continuously propagated through the light guide film 201a and a remaining portion of the light is radiated to the display panel 1. Accordingly, the light radiation portion 201 of the backlight may be formed of a film having a function equal to a function of the light semi-transmissive film 201b in place of the light semi-transmissive film 201b. As a member which has the function equal to the function of the light semi-transmissive film 201b, a polarization reflective film can be named, for example.

The polarization reflective film is, for example, a member whose polarization surface allows only a component of the light which is directed in a certain direction to pass through and reflects remaining components of the light. Accordingly, with the use of the polarization reflective film in place of the light semi-transmissive film 201b, out of the light which propagates through the light guide film 201a, only the component which agrees with a transmission axis (a polarization axis) of the polarization reflective film passes through the polarization reflective film and is radiated to the display panel 1. Then, the remaining components are reflected and continuously propagated through the light guide film 201a. The light which is reflected on the interface with the polarization reflective film 201b is reflected on the interface with the reflective film 201c and, again, is incident on the interface with the polarization reflective film 201b. By allowing the light which propagates through the light guide film 201a to repeat the operation, the light 4 which is incident on the light guide film 201a is converted into a planar light and is radiated to the display panel 1.

Here, the light which is radiated to the display panel 1 from the light guide film 201a after passing through the polarization reflective film is a light whose polarization surface agrees with the transmission axis of the polarization reflective film. Accordingly, in using the polarization reflective film, for example, as shown in FIG. 3, when the polarization reflective film 201d is adhered to a surface of the light guide film 201a which faces the display panel 1 in an opposed manner, a transmission axis AX1 of the polarization reflective film 201d is directed in the same direction as a transmission axis AX2 of the polarizer 3A which is adhered to a surface of the display panel 1 which faces the light radiation portion 201 in an opposed manner. Due to such a constitution, the polarization surface of the light which is radiated to the display panel 1 from the light guide film 201a after passing through the polarization reflective film 201d agrees with the transmission axis AX2 of the polarizer 3A which is positioned in front of the display panel 1 and hence, the light is allowed to pass through the polarizer 3A and to be incident on the display panel 1.

Further, by setting a thickness of the polarization reflective film 201d to 0.05 mm or less, for example, in the same manner as the light semi-transmissive film 201b and by forming the polarization reflective film 201d, the light guide film 201a and the reflective film 201c into the integral structure, the light radiation portion 201 of the backlight can be made thin and light-weighted.

Here, in FIG. 3, the transmission axis AX1 of the polarization reflective film 201d is arranged parallel to a side of the light guide film 201a on which the light is incident. However, provided that the direction of the transmission axis AX1 agrees with the direction of the transmission axis AX2 of the polarizer 3A which is adhered to the display panel 1, the transmission axis AX1 may be directed in any direction.

Embodiment 2

Figure 4:
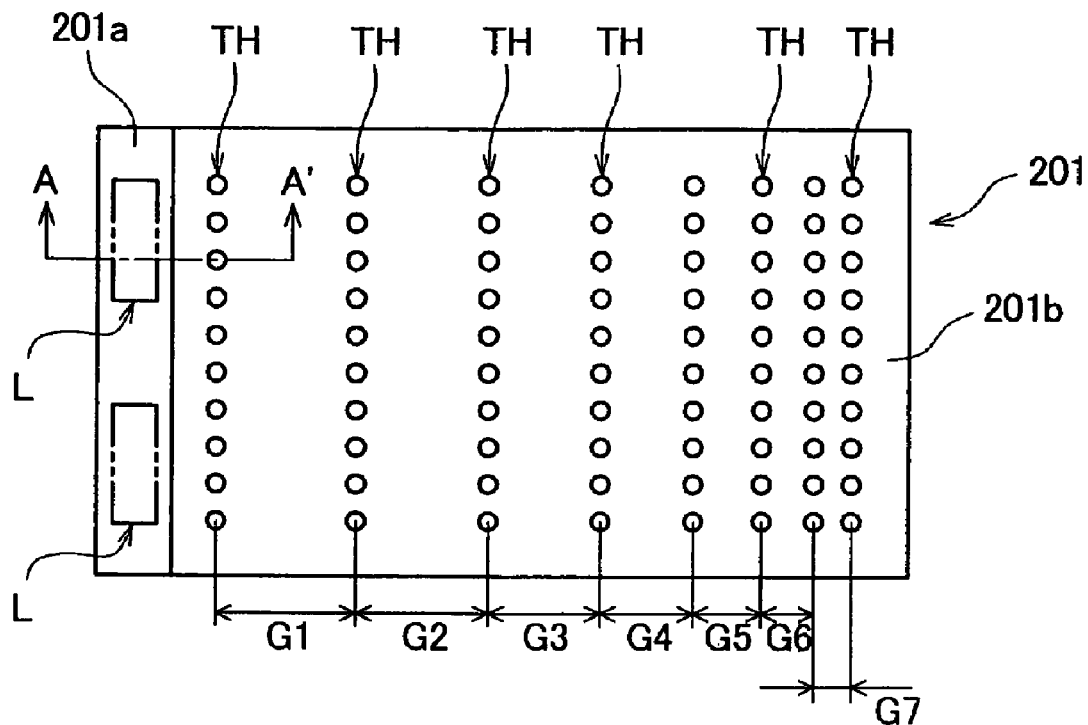
FIG. 4 is a schematic view showing the schematic constitution of a backlight of an embodiment 2 according to the present invention.

FIG. 4 is a schematic view showing the schematic constitution of a backlight of an embodiment 2 according to the present invention. Further, FIG. 5 is a cross-sectional view taken along a line A-A' of FIG. 4.

In the embodiment 2, on the premise of the constitution of the embodiment 1, a constitutional example of a light radiation portion 201 which can obtain the in-plane uniformity of the brightness (the light quantity) of light radiated on the display panel 1 is explained.

Figure 5:
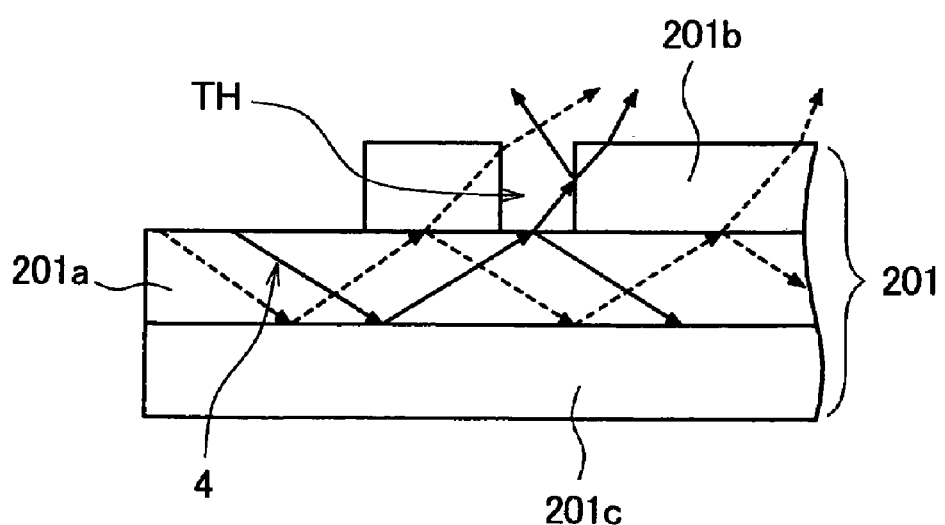
FIG. 5 is a cross-sectional view taken along a line A-A' in FIG. 4.

Here, the light radiation portion 201 of the backlight is, for example, as shown in FIG. 4 and FIG. 5, formed into the integral structure by sandwiching the light guide film 201a between the light semi-transmissive film 201b and the reflective film 201c. A thickness of the light guide film 201a is set to 0.25 mm or less. Further, thicknesses of the light semi-transmissive film 201b and the reflective film 201c are respectively set to 0.05 mm or less, for example. Further, the light guide film 201a, the light semi-transmissive film 201b and the reflective film 201c are respectively made of materials explained in conjunction with the embodiment 1. Further, the light guide film 201a, the light semi-transmissive film 201b and the reflective film 201c are formed into the integral structure by the method explained in conjunction with the embodiment 1.

Further, in this embodiment 2, a plurality of through holes (through holes) TH is formed in a plurality of portions of the semi-transmissive film 201b. The through holes TH are formed by etching the light semi-transmissive film 201b, for example.

Further, the through holes TH are, for example, as shown in FIG. 4, formed in such a state that a plurality of rows in which a plurality of through holes TH is arranged in parallel to a side of the light guide film 201a on which a region L on which light is incident is formed is arranged in the propagation direction of the light. Here, it is preferable to set intervals G1, G2, G3, G4, G5, G6, G7 between the respective through holes TH in a state that the remoter the interval from the side of the light guide film 201a on which light is incident, the smaller the interval becomes as shown in FIG. 4. Further, although the number of rows of the through holes TH is eight in the example shown in FIG. 4, it is needless to say that the number of rows may be other than eight.

When these through holes TH are formed in the light semi-transmissive film 201b, for example, as shown in FIG. 5, the light 4 which is incident on the light guide film 201a from a certain position of the light guide film 201a propagates through the light guide film 201a following a path indicated by a solid-line arrow. Here, the light which is reflected on the reflective film 201c and is incident on the interface with the light semi-transmissive film 201b is incident on a region where the through holes TH are formed. The light which is incident on the region where the through holes TH are formed is refracted and is radiated into inner spaces formed in the through holes TH. Then, the light is reflected or is refracted on side surfaces of the through holes TH and is radiated in the direction where the display panel 1 is arranged. That is, by forming the through holes TH, the light is irregularly reflected on the side surfaces of the through holes TH and is radiated in the direction where the display panel 1 is arranged. Accordingly, in comparison with the case of the embodiment 1, the in-plane uniformity of the brightness (light quantity) of the light radiated to the display panel 1 is enhanced.

Further, the light which propagates through the light guide film 201a exhibits a large light quantity in a region closer to the side on which the light is incident and the light quantity is gradually decreased as the region is away from the side on which the light is incident. Accordingly, as shown in FIG. 4, by increasing the distribution density of the through holes TH in the region remote from the side on which the light is incident thus facilitating the irregular reflection of the light, the in-plane uniformity of brightness (light quantity) of the light which is radiated to the display panel 1 is further enhanced.

Figure 6:
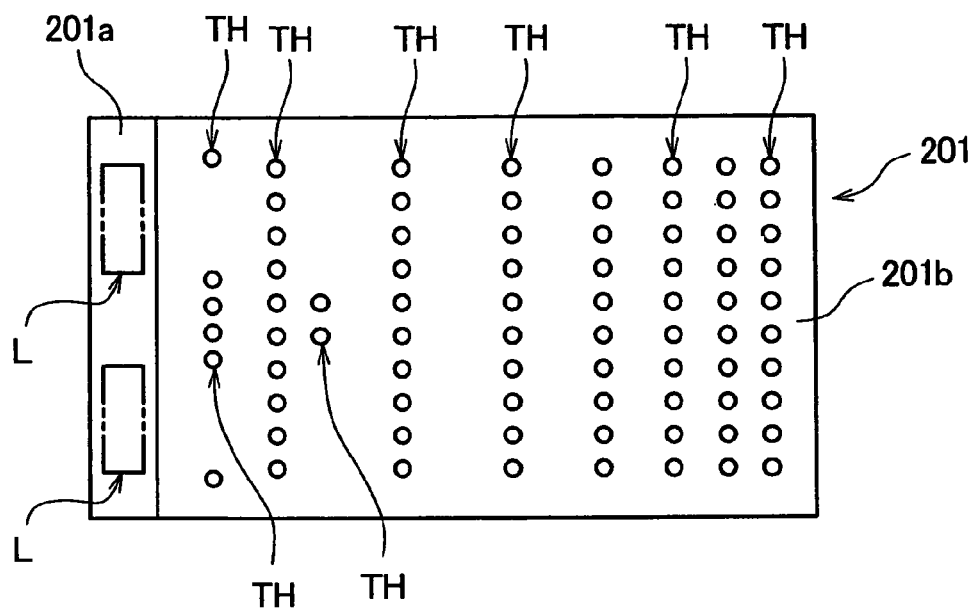
FIG. 6 is a schematic view for explaining a modification of the embodiment 2.

FIG. 6 is a schematic view for explaining a modification of the embodiment 2.

In the backlight of the embodiment 2, for example, when the light source of the light 4 which is incident on the light guide film 201a is formed of a plurality of spot light sources, for example, even in a region closer to the side on which the light is incident, the light quantity is decreased between two spot light sources in the side direction. Accordingly, in the backlight which uses the plurality of spot light sources, it is preferable to arrange the through holes TH of the light semi-transmissive film 201b in a state as shown in FIG. 6, for example.

FIG. 6 shows a case in which the spot light sources are arranged on two regions L of the light guide film. With respect to a point that a plurality of rows in which a plurality of through holes TH is arranged in parallel with a side of the light guide film 201a on which light is incident is arranged in the transmission direction of the light, the constitution of the embodiment 2 is similar to the constitution of the embodiment 1. Further, in a region closer to the side on which the light is incident, spreading of light from the spot light source is insufficient and hence, a region where the light quantity is small is formed between the spot light sources. Accordingly, by providing more plurality of through holes TH in the region to increase the distribution density of the through holes TH, it is possible to further enhance the in-plane uniformity of the brightness (light quantity) of light which is incident on the display panel 1.

In this manner, in the backlight of the embodiment 2, even when the spot light sources are used, it is possible to enhance the in-plane uniformity of the brightness (light quantity) of the light radiated on the display panel 1.

Figure 7:
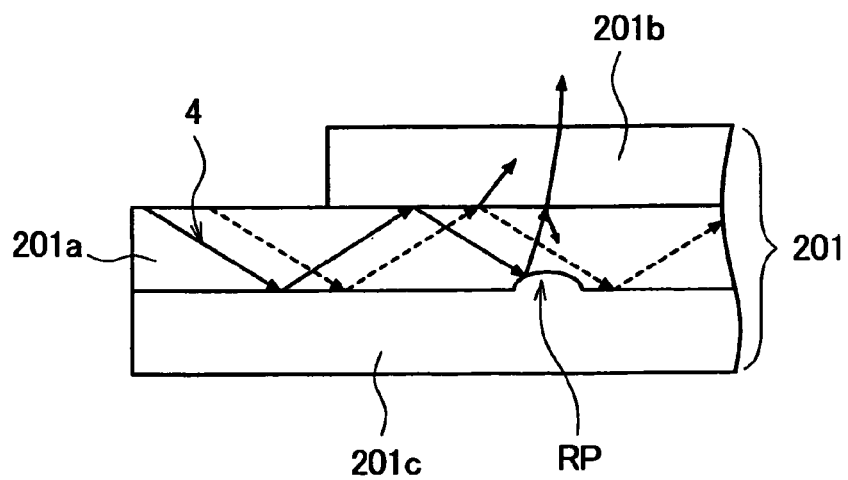
FIG. 7 is a schematic view for explaining a variation of the embodiment 2.

FIG. 7 is a schematic view for explaining a variation of the embodiment 2.

The embodiment 2 is configured to enhance the in-plane uniformity of light radiated on the display panel 1 with irregular reflection of light which is radiated in the direction of the display panel 1 from the light guide film 201a. Here, as an example of a method of reflecting light irregularly, as shown in FIG. 4 or the like, an example which forms the through holes TH in the light semi-transmissive film 201b is shown. However, instead of forming the through holes TH in the light semi-transmissive film 201b, for example, as shown in FIG. 7, it is possible to obtain the similar advantageous effect by forming a pattern which irregularly reflects the light (hereinafter referred to as an irregular reflection pattern) RP on the interface between the light guide film 201a and the reflective film 201c.

When such an irregular reflection pattern RP is formed on the interface between the light guide film 201a and the reflective film 201c, for example, as shown in FIG. 7, the light 4 which is incident from a certain position of the light guide film 201a propagates through the light guide film 201a following a path indicated by a solid-line arrow. Here, the light reflected on the irregular reflection pattern RP of the reflective film 201c changes the path and the incident angle to the interface with the light semi-transmissive film 201b is changed before and after the light is reflected on the irregular reflection pattern RP. Here, the incident angle of the light is decreased after the light is reflected on the irregular reflection pattern. When the light is incident at a deep angle, a portion of the light is refracted with the interface with the light semi-transmissive film 201b and radiated in the direction where the display panel 1 is arranged. Accordingly, in the same manner as the case in which the through holes TH are formed in the light semi-transmissive film, the in-plane uniformity of the brightness (light quantity) of the light radiated to the display panel 1 is enhanced.

Further, here, the light guide film 201a and the reflective film 201c have the integral structure by being adhered using a transparent optical adhesive agent, for example, and there is no gap on the interface. Accordingly, it is possible to prevent the increase of the loss of light due to the leaking of light from the interface between the light guide film 201a and the reflective film 201c.

Here, when the irregular reflection pattern RP is formed at the interface between the light guide film 201a and the reflective film 201c, the irregular reflection pattern RP may be arranged, in the same manner as the arrangement of the through holes TH in the light semi-transmissive film 201b shown in FIG. 4 or FIG. 6, in a state that the distribution density is higher in a region remoter from the side of the light guide film 201a on which light is incident or in a region between the spot light sources.

Further, although, in the embodiment 2, the explanation is made with respect to the example in which the light semi-transmissive film 201b is used, it is needless to say that the polarization reflective film 201d may be used in place of the light semi-transmissive film 201b.

Further, although, in the embodiment 2, for example, as shown in FIG. 4, the through holes TH are arranged in a row, it is needless to say that the through holes TH may be arranged at arbitrary positions.

Embodiment 3

Figure 8:
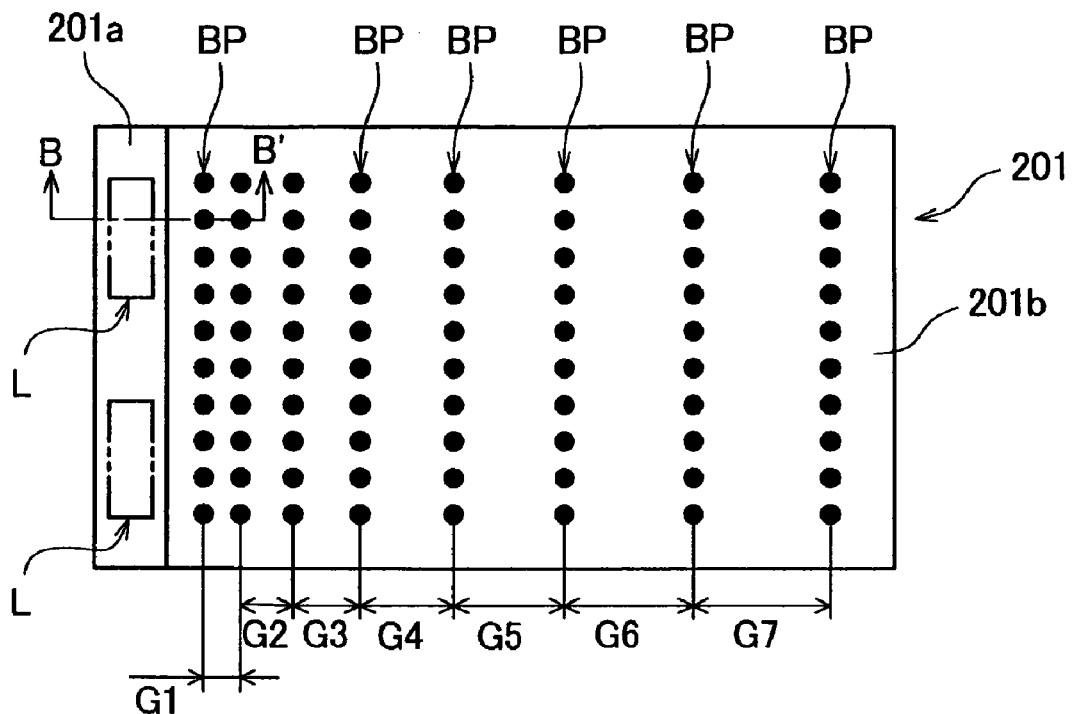
FIG. 8 is a schematic view showing the schematic constitution of a backlight of an embodiment 3 according to the present invention.

FIG. 8 is a schematic view showing the schematic constitution of a backlight of an embodiment 3 according to the present invention. Further, FIG. 9 is a cross-sectional view taken along a line B-B' in FIG. 8.

In the embodiment 3, a constitutional example of the light radiation portion 201 which enables the in-plane uniformity of the brightness (light quantity) of the light radiated on the display panel 1 on the premise of the constitution of the embodiment 1 and in a method different from the embodiment 2 is explained.

Figure 9:
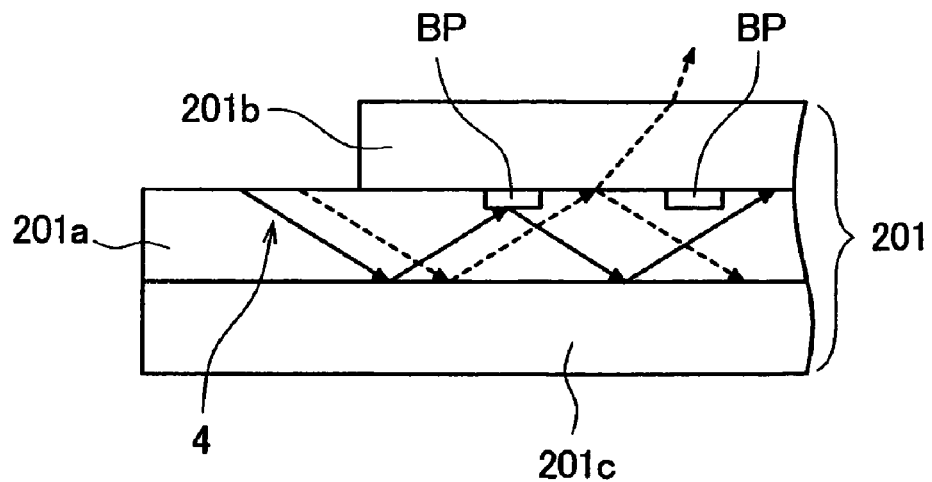
FIG. 9 is a cross-sectional view taken along a line B-B' in FIG. 8.

Here, the light radiation portion 201 of the backlight is, as shown in FIG. 8 and FIG. 9, formed in the integral structure by sandwiching the light guide film 201a between the light semi-transmissive film 201b and the reflective film 201c. The thickness of the light guide film 201a is set to 0.25 mm and less. Further, the thicknesses of the light semi-transmissive film 201b and the reflective film 201c are respectively set to 0.05 mm or less. Further, the light guide film 201a, the light semi-transmissive film 201b and the reflective film 201c are made of the materials which are explained in the embodiment 1. Further, the light guide film 201a, the light semi-transmissive film 201b and the reflective film 201c are formed in the integral structure in such a manner which is explained in conjunction with the embodiment 1.

Further, in the case of embodiment 3, the light semi-transmissive film 201b is provided with a pattern which blocks light on a plurality of portions (hereinafter, referred to as a light blocking pattern) BP. This light blocking pattern BP is, for example, formed by printing the white ink or the like.

Further, the light blocking patterns BP are, for example, as shown in FIG. 8, formed in such a state that a plurality of rows in which a plurality of light blocking patterns BP is arranged in parallel to a side of the light guide film 201a on which a region L on which light is incident is formed is arranged in the transmission direction of the light. Here, as shown in FIG. 8 it is preferable to set intervals between the respective light blocking patterns BP G1, G2, G3, G4, G5, G6, G7 in a state that the remoter the interval from the side of the light guide film 201a on which the light is incident, the smaller the gap becomes. Further, although the number of rows of the light blocking patterns BP is eight in an example shown in FIG. 8, it is needless to say that the number may be other than eight.

When the light blocking patterns BP are provided to the light semi-transmissive film 201b, for example, as shown in FIG. 9, the light 4 which is incident from a certain position of the light guide film 201a propagates through the light guide film 201a following a path indicated by a solid-line arrow. Here, the light which is reflected on the reflective film 201c and is incident on the interface with the light semi-transmissive film 201b is blocked (reflected) with the light blocking patterns BP and hence, the light is not radiated in the direction where the display panel is arranged after propagating through the light transmissive film 201b. That is, by providing the light blocking patterns BP, it is possible to limit the light quantity of the light radiated in the direction where the display panel 1 is arranged. Accordingly, compared to the case of the embodiment 1, the in-plane uniformity of the brightness (light quantity) of the light radiated on the display panel 1 is enhanced.

Further, here, the light which propagates through the light guide film 201a exhibits a large light quantity in a region closer to the side on which the light is incident and the light quantity is gradually decreased as the region recedes from the side on which the light is incident. Accordingly, as shown in FIG. 8, by increasing the distribution density of the light blocking patterns BP in the region close to the side on which the light is incident and by decreasing the light quantity of the light radiated in the direction where the display panel 1 is arranged, the in-plane uniformity of the brightness (light quantity) of the light radiated on the display panel is further enhanced.

Figure 10:
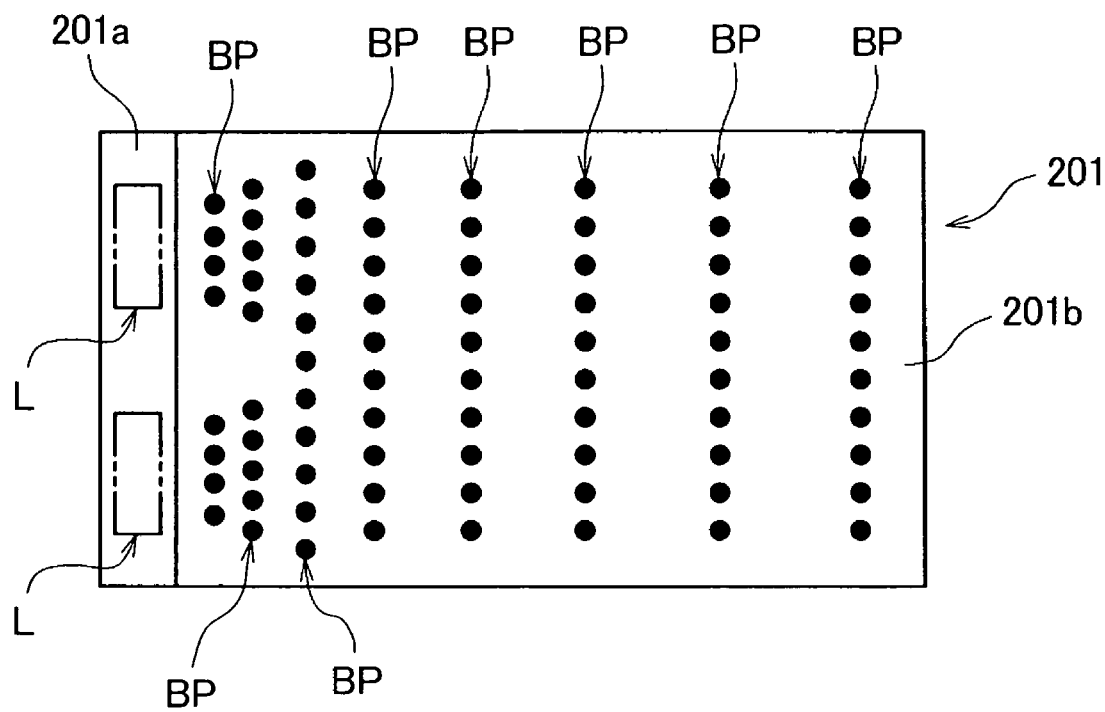
FIG. 10 is a schematic view for explaining a modification of the embodiment 3.

FIG. 10 is a schematic view for explaining a modification of the embodiment 3.

In the backlight of the embodiment 3, for example, when the light source of the light 4 which is incident on the light guide film 201a is formed of a plurality of spot light sources, for example, even in the region closer to the side on which the light is incident, the light quantity is decreased between two spot light sources in the side direction. Accordingly, in the backlight which uses the plurality of light sources, it is preferable to arrange the light blocking patterns BP in a state as shown in FIG. 10, for example.

FIG. 10 shows a case in which the spot light sources are arranged on two regions L of the light guide film 201a. With respect to a point that a plurality of rows in which a plurality of light blocking patterns BP is arranged in parallel to a side of the light guide film 201a on which the light is incident is arranged in the propagating direction of the light, the constitution of the embodiment 3 is similar to the constitution of the embodiment 1. Further, in a region closer to the side on which the light is incident, spreading of light from the spot light source is insufficient and hence, a region where the light quantity is small is formed between the spot light sources. Accordingly, by increasing the distribution density of the light blocking pattern in the region immediately front of the spot light source where the light quantity is large in the region close to the side where the light is incident, it is possible to further enhance the in-plane uniformity of the brightness (light quantity) of light which is incident on the display panel 1.

In this manner, in the backlight of the embodiment 3, even when the spot light sources are used, it is possible to enhance the in-plane uniformity of the brightness (light quantity) of the light radiated on the display panel.

Further, although, in the embodiment 3, the explanation is made with respect to the example in which the light semi-transmissive film 201b is used, it is needless to say that the polarization reflective film 201d may be used in place of the light semi-transmissive film 201b.

Further, although, in the embodiment 3, for example, as shown in FIG. 8, the light blocking patterns BP are arranged in a row, it is needless to say that the light blocking patterns BP may be arranged at arbitrary positions.

Embodiment 4

Figure 11:
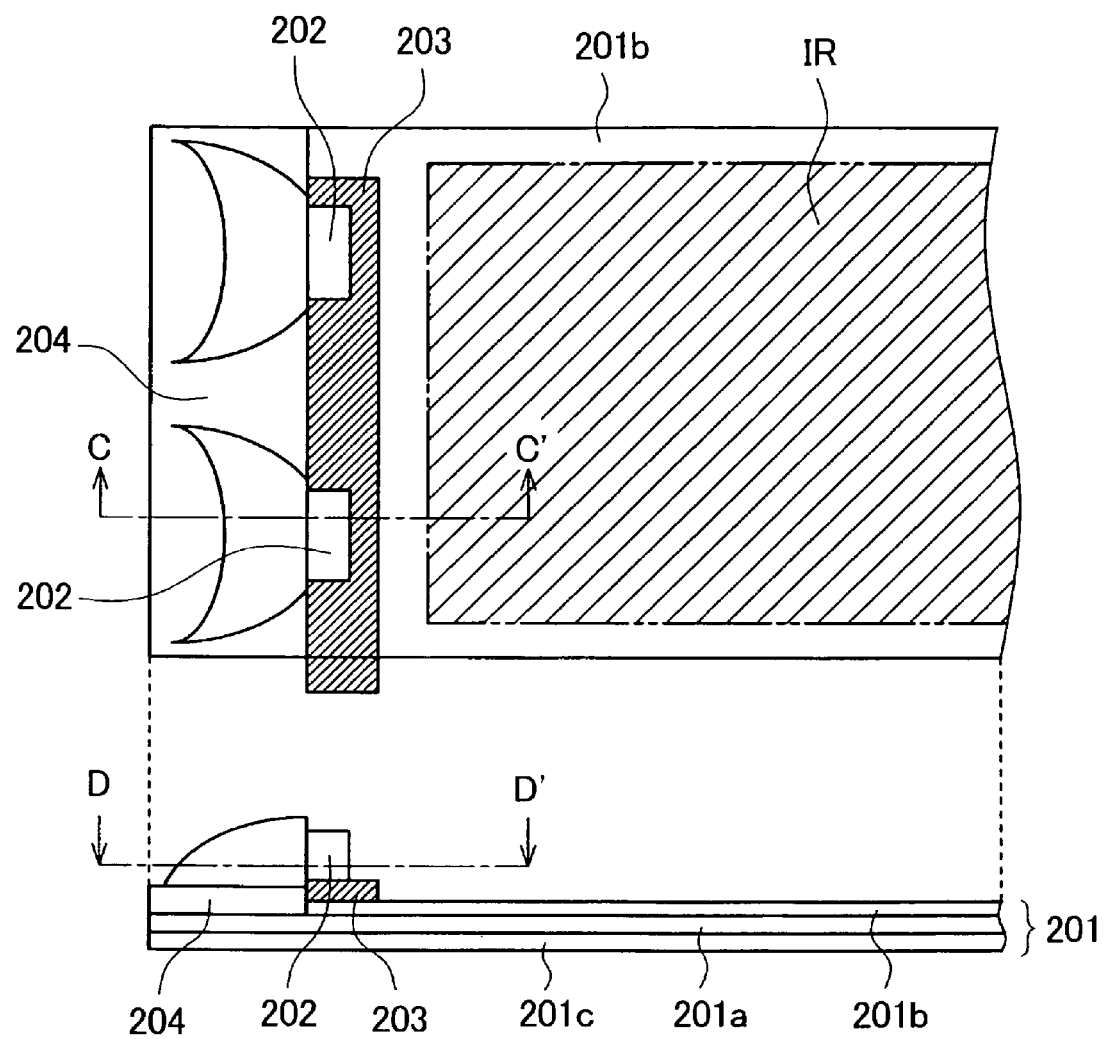
FIG. 11 is a schematic view showing the schematic constitution of a backlight of an embodiment 4 according to the present invention.
Figure 12:
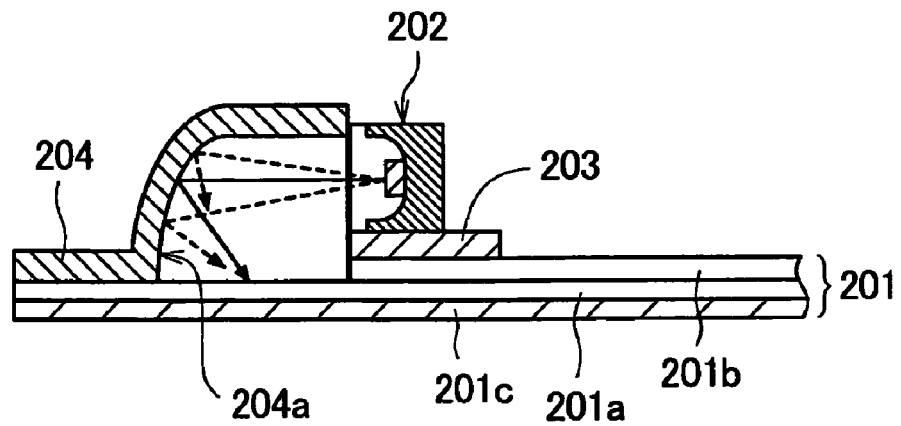
FIG. 12 is a cross-sectional view taken along a line C-C' in FIG. 11.
Figure 13:
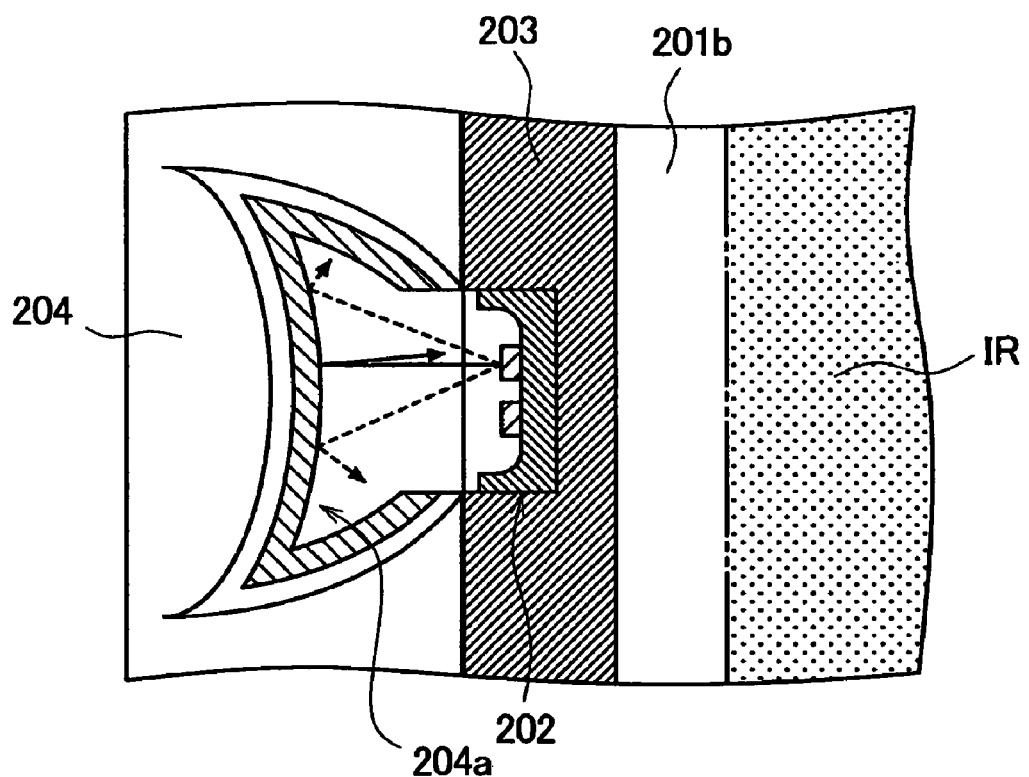
FIG. 13 is a cross-sectional view taken along a line D-D' in FIG. 11.

FIG. 11 is a schematic view showing the schematic constitution of the backlight of the embodiment 4 according to the present invention. Further, FIG. 12 is a cross-sectional view taken along a line C-C' in FIG. 11. Further, FIG. 13 is a cross-sectional view taken along a line D-D' in FIG. 11. Here, FIG. 11 shows a front view of the backlight and a side view of the lower side of the backlight.

In the embodiment 4, on the premise of the constitution of the light radiation portion 201 of the backlight which is explained in conjunction with the embodiment 1 to the embodiment 3, constitutional example of a backlight including a light source of light which is incident on the light guide film 201a.

Here, the light radiation portion 201 of the backlight is, as shown in FIG. 11 to FIG. 13, formed in the integral structure by sandwiching the light guide film 201a between the light semi-transmissive film 201b and the reflective film 201c. The thickness of the light guide film 201a is set to 0.25 mm or less. Further, the thicknesses of the light semi-transmissive film 201b and the reflective film 201c are respectively set to 0.05 mm or less, for example. Further, the light guide film 201a, the light semi-transmissive film 201b and the reflective film 201c are respectively made of materials explained in conjunction with the embodiment 1. Further, the light guide film 201a, the light semi-transmissive film 201b and the reflective film 201c are formed in the integral structure in such a manner which is explained in conjunction with the embodiment 1.

Further, here, the light radiation portion 201 may have, for example, through holes TH formed in the light semi-transmissive film 201b at a plurality of positions in the same manner as the embodiment 2. Further, in place of the through holes TH, for example, an irregular reflection pattern RP may be provided with the interface between the light guide film 201a and the reflective film 201c. Further, for example, in the same manner as the embodiment 3, light blocking patterns BP may be provided with the interface between the light semi-transmissive film 201b and the light guide film 201a.

A light source of light 4 which is incident on the light guide film 201a is formed of a spot light source 202 such as an LED, for example. The spot light sources 202 are mounted on a flexible circuit board 203, for example. Here, the flexible circuit board 203 on which the spot light sources 202 are mounted is arranged on, for example, on the light semi-transmissive film 201b of the light radiation portion 201, and outside a region where the light is radiated to a display region of the display panel 1 (hereinafter referred to as a radiation region) IR. Further, the spot light sources 202 on the flexible circuit board 203 use a side-view-type LED, for example, and are mounted in a state that the light is radiated in the film surface direction of the light guide film 201a and in the direction opposite to radiation region IR.

Figure 14:
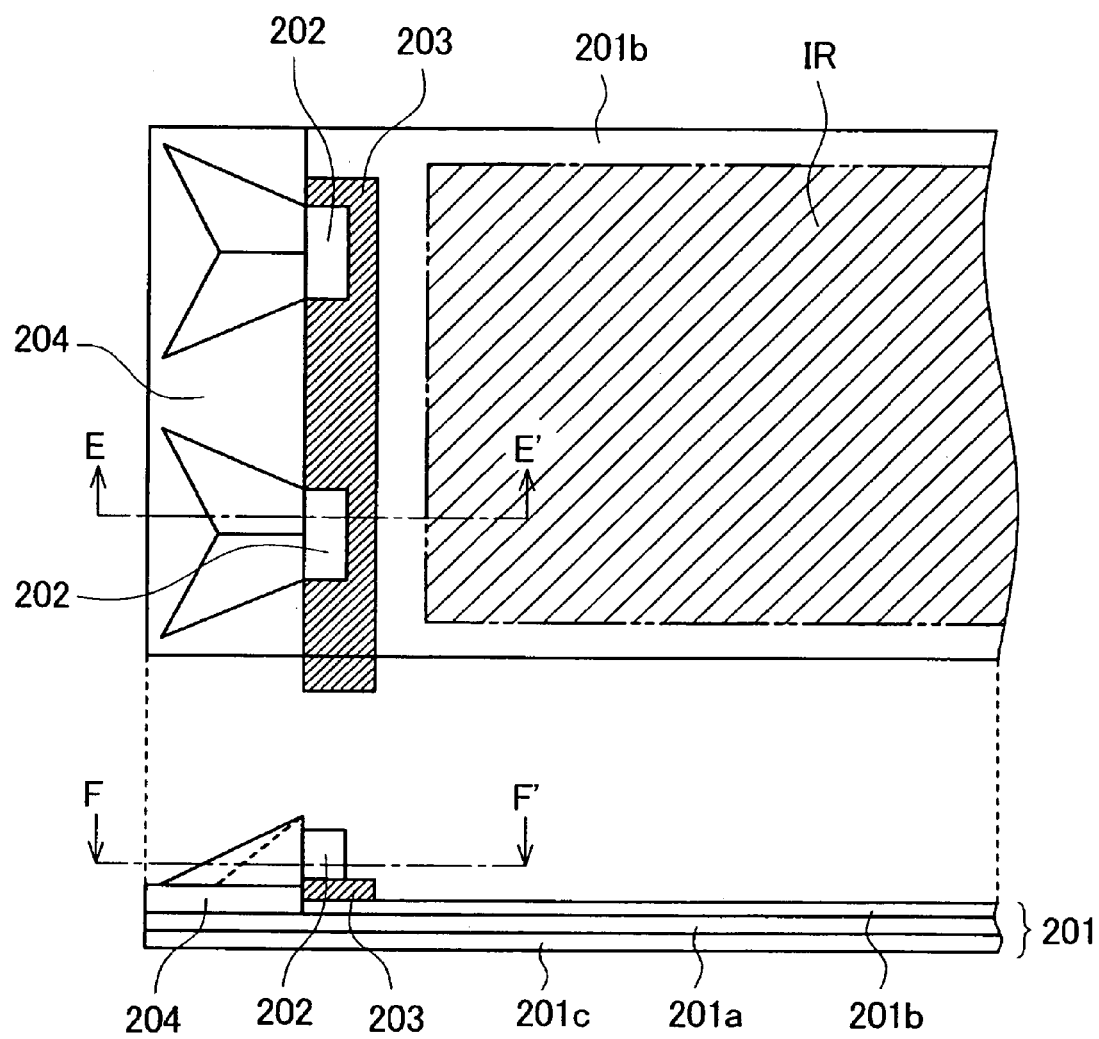
FIG. 14 is a schematic view for explaining a modification of the embodiment 4.
Figure 15:
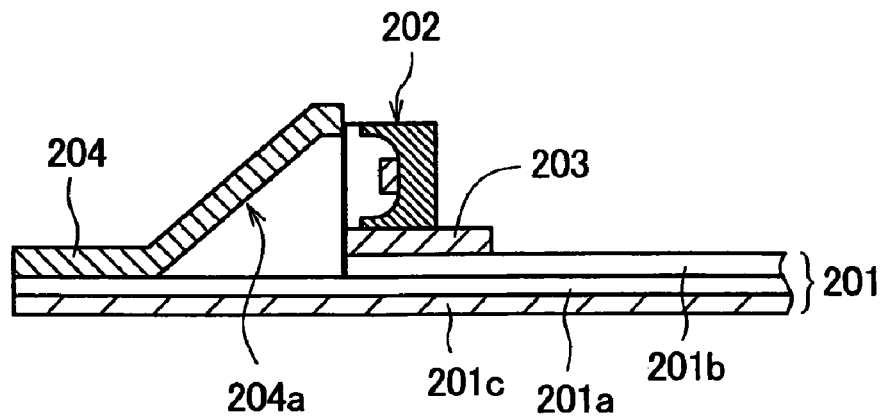
FIG. 15 is a cross-sectional view taken along a line E-E' in FIG. 14.

Further, here, a reflector 204 is provided to an end port ion of the light guide film 201a on a side on which the spot light sources 202 are arranged. The light 4 which is radiated from the spot light source 202 is, as shown in FIG. 14 and FIG. 15, reflected on a reflective surface 204a of the reflector 204 and changes the direction thereof to the radiation region IR and, thereafter, is incident on the light guide film 201a. The manner in which the incident light 4 propagates through the light guide film 201a is the same manner as explained in conjunction with the embodiments 1 to 3 and hence, the detailed explanation is omitted.

Here, in the embodiment 4, the spot light source 202 such as LED is used as the spot light source, and this LED is usually configured such that the spreading of radiated light 4 is small to enhance the brightness. Accordingly, out of the reflective surfaces 204a of the reflection plate 204, by forming the surface which faces the light radiation surface of the spot light source 202 in an opposed manner, for example, to project to the spot light source 202 side as shown in FIG. 13, it is possible to spread the light of the spot light source 202. Due to such a constitution, it is possible to effectively propagate the light to a region between two spot light sources 202.

Figure 16:
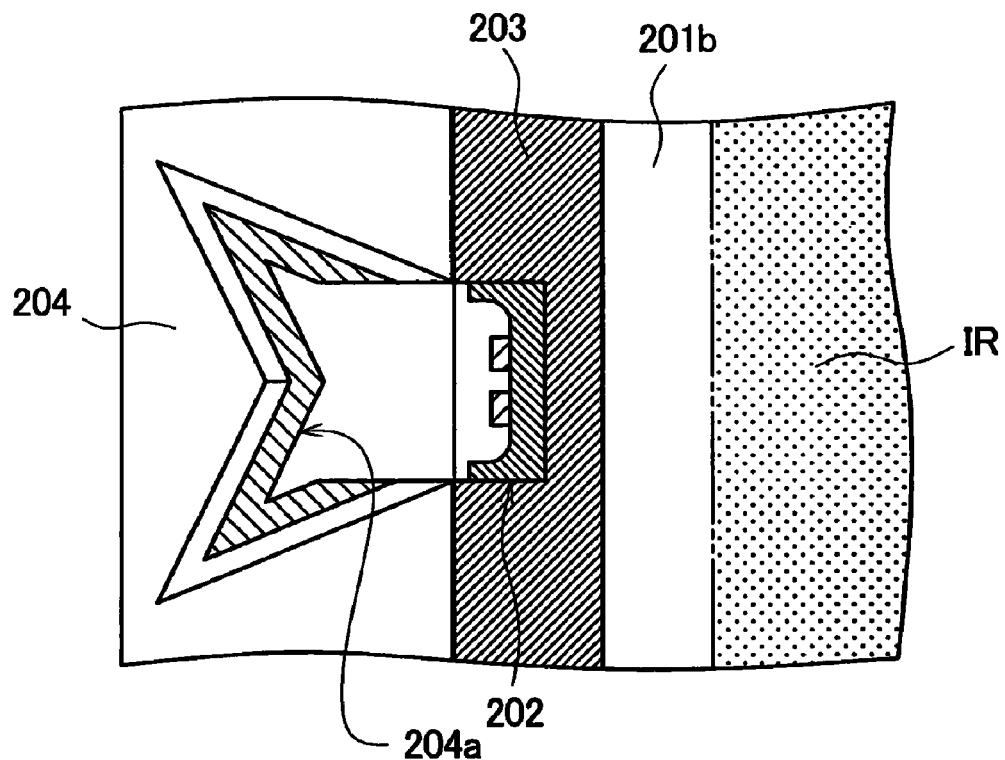
FIG. 16 is a cross-sectional view taken along a line F-F' in FIG. 14.

FIG. 14A and FIG. 14B are schematic views for explaining a modification of the embodiment 4, wherein FIG. 14A is a front view of a backlight and FIG. 14B is a side view of a lower portion of the backlight. Further, FIG. 15 is a cross-sectional view taken along a line E-E' in FIG. 14A, and FIG. 16 is a cross-sectional view taken along a line F-F' in FIG. 14B.

The backlight of the embodiment 4 uses the spot light source 202 formed of a side-view-type LED, wherein light radiated toward the film surface of a light guide film 201a from the spot light source 202 is reflected on the reflector 204 and is incident on the light guide film 201a. Here, for example, as shown in FIG. 13, by forming a reflection surface 204a which forms a convex curved surface on a spot-light-source-202 side of the reflector 204, the light radiated from the spot light source 202 can be spread. However, this embodiment is not limited to the reflective surface 204a having the convex curved surface shown in FIG. 13 and, it is possible to spread the light radiated from the spot light source 202 by also using a reflective surface 204b which projects toward the spot-light-source-202 side by combining planar surfaces shown in FIG. 14 to FIG. 16, for example.

Figure 17:
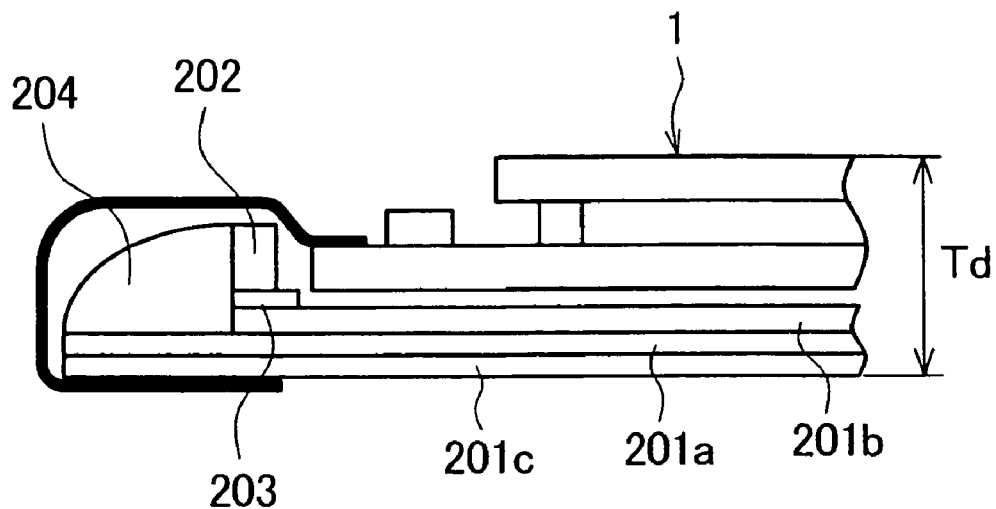
FIG. 17 is a schematic view for explaining one of advantageous effects of the backlight of the embodiment 4.

FIG. 17 is a schematic view for explaining one advantageous effect of the backlight of the embodiment 4. Further, FIG. 18 is a schematic view showing a constitutional example of a display device which uses a conventional general backlight for comparison with the backlight of the embodiment 4.

The backlight of the embodiment 4 is integrally constituted of the light guide film 201a, the light semi-transmissive film 201b and the reflective film 201c thus reducing a thickness of the light radiation portion 201. Further, the spot light source 202 of the light which is incident on the light guide film 201a is formed on the light guide film 201a, and is arranged outside a radiation region IR which radiates the light to the display panel 1. Accordingly, in the display device which uses the backlight of the embodiment 4, for example, as shown in FIG. 17, it is possible to arrange the spot light source 202 and the reflector 204 in the direction toward the side surface of the display panel 1. Due to such a constitution, it is possible to absorb an amount of thickness corresponding to a height of the flexible printed circuit board 203 and the height of the mounted spot light source 202 which is arranged over the light semi-transmissive film 201b and hence, a thickness Td of the structure obtained by overlapping the display panel 1 and the backlight (the light radiation portion 201) to each other can be reduced.

Figure 18:
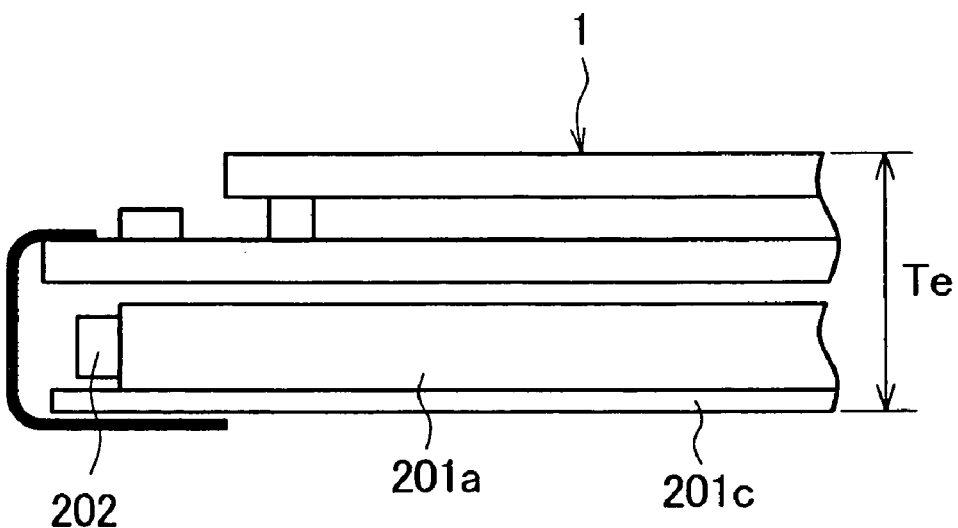
FIG. 18 is a schematic view showing a constitutional example of a display device which uses a conventional general backlight for comparing with the backlight of the embodiment 4.

The conventional display device uses the light guide plate formed by injection molding, for example, and the spot light source 202 is arranged on a side surface of the light guide plate 201e as shown in FIG. 18. By providing such a constitution to the backlight, the thickness of the light guide plate 201e becomes approximately 0.4 mm, for example. Accordingly, a thickness Te of the structure obtained by overlapping the display panel 1 and the backlight (the light radiation portion 201) to each other becomes approximately 1.06 mm, for example.

On the other hand, in case of the display device which uses the backlight of the embodiment 4, the thickness of the light radiation portion 201 of the backlight becomes 0.35 mm or less. Accordingly, the thickness Td of the structure obtained by overlapping the display panel 1 and the backlight (the light radiation portion 201) to each other becomes approximately 0.95 mm.

In view of the above, with the use of the backlight of the embodiment 4, the display device can be made thin and light-weighted, and the in-plane uniformity of a light quantity of the radiation region IR is enhanced.

Here, in this embodiment 4, a case which uses the light semi-transmissive film 201b is exemplified. However, it is needless to say that a polarization reflective film 201d may be used in place of the light semi-transmissive film 201b.

Embodiment 5

Figure 19:
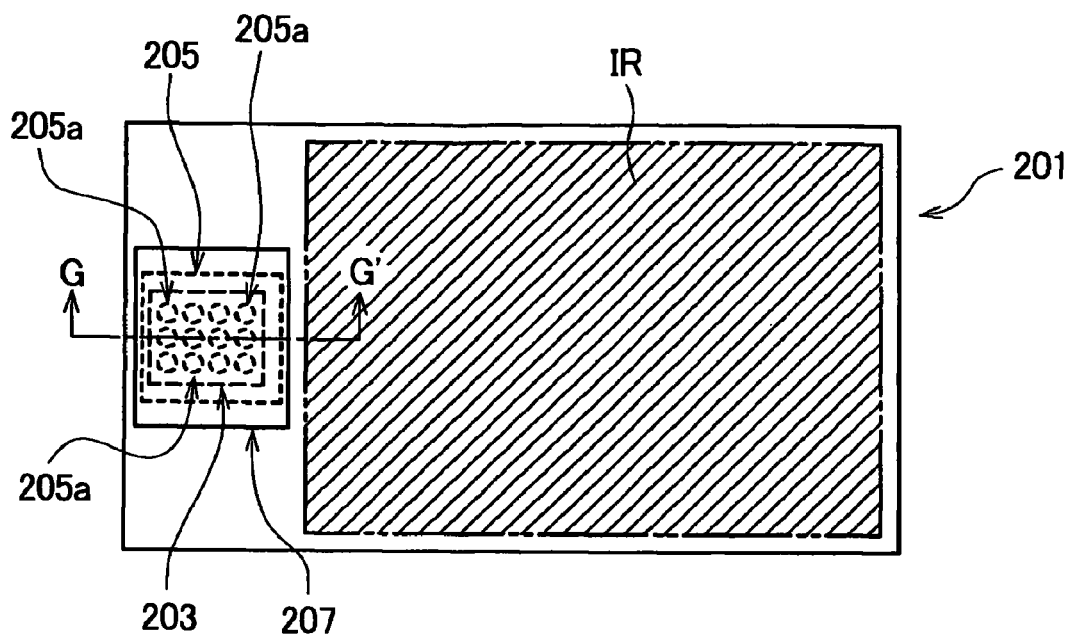
FIG. 19 is a schematic view showing the schematic constitution of a backlight of an embodiment 5 according to the present invention.
Figure 20:
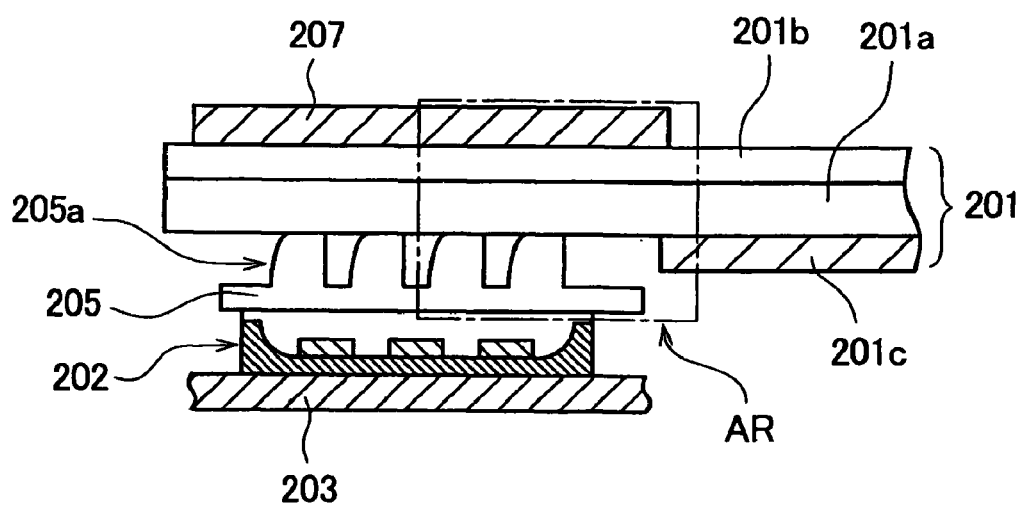
FIG. 20 is a cross-sectional view taken along a line G-G' in FIG. 19.
Figure 21:
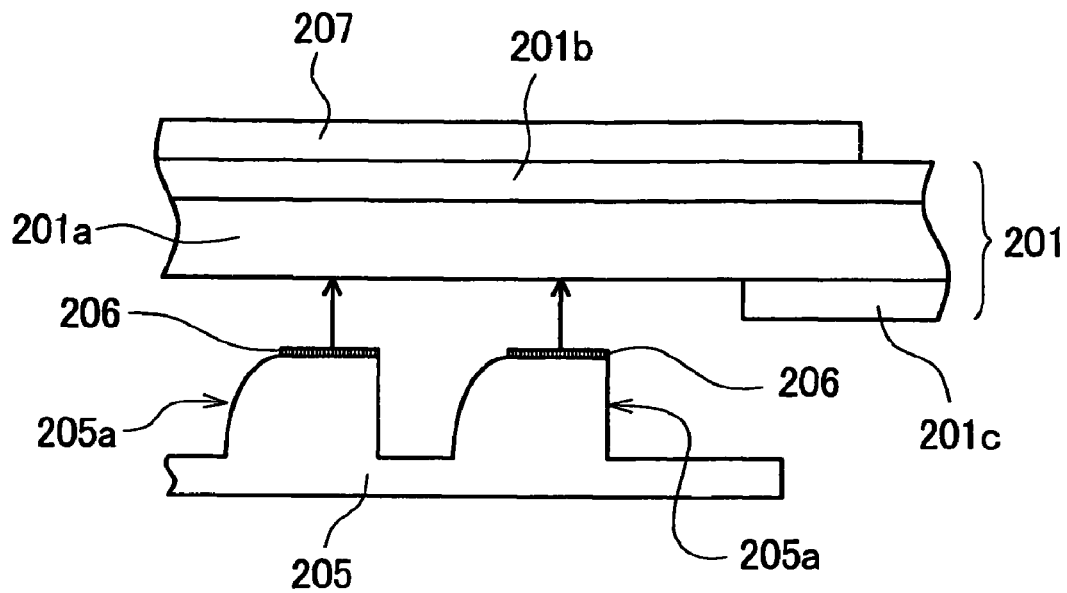
FIG. 21 is a schematic view for explaining a mounting method of an incident-light adjusting member.

FIG. 19 is a schematic view showing the schematic constitution of a backlight of an embodiment 5 according to the present invention, FIG. 20 is a cross-sectional view taken along a line G-G' in FIG. 19, and FIG. 21 is a schematic view for explaining a mounting method of an incident-light adjusting member.

In the embodiment 5, on the premise of the constitution of the light radiation portion 201 of the backlight explained in conjunction with the embodiment 1 to embodiment 3, another constitutional example of the backlight which includes the light source of light incident on the light guide film 201a is explained.

Here, the light radiation portion 201 of the backlight is, as shown in FIG. 19 and FIG. 20, formed into the integral structure in which the light guide film 201a is sandwiched between the light semi-transmissive film 201b and a reflective film 201c. A thickness of the light guide film 201a is set to 0.25 mm or less. Further, thicknesses of the light semi-transmissive film 201b and the reflective film 201c are respectively set to 0.05 mm or less, for example. Further, the light guide film 201a, the light semi-transmissive film 201b and the reflective film 201c are respectively made of the material which has been explained in conjunction with the embodiment 1, for example. Further, the light guide film 201a, the light semi-transmissive film 201b and the reflective film 201c are formed into the integral structure using the method explained in conjunction with the embodiment 1.

Further, in the light radiation portion 201, through holes TH may be formed in a plurality of portions of the light semi-transmissive film 201b as in the case of the embodiment 2, for example. Further, in place of the through holes TH, an irregular reflection pattern RP may be provided to an interface between the light guide film 201a and the reflective film 201c. Still further, for example, as in the case of the embodiment 3, a light blocking pattern BP may be provided to an interface between the light semi-transmissive film 201b and the light guide film 201a.

Further, a light source of light 4 which is incident on the light guide film 201a may be a spot light source 202 formed of an LED, for example. The spot light source 202 may be mounted on the flexible printed circuit board 203, for example. Here, the flexible printed circuit board 203 on which the spot light source 202 is mounted is arranged on a side of the light radiation portion 201 (the light guide film 201a) to which the reflective film 201c is provided, for example and, at the same time, outside a radiation region IR which radiates light to a display region of a display panel 1. Here, the spot light source 202 on the flexible printed circuit board 203 is formed of a top-view type LED, for example, and is mounted so as to radiate light in the direction perpendicular to the film-surface direction of the light guide film 201a.

Here, between the light guide film 201a and the spot light source 202, an incident-light adjusting member 205 which forms a plurality of projections 205a on a surface thereof which faces the light guide film 201a in an opposed manner is interposed. The incident-light adjusting member 205 is made of a material equal to a material of the light guide film 201a. Further, the incident-light adjusting member 205 has a distal end of the projection 205a thereof formed in a flat surface shape and is brought into close contact with a film surface of the light guide film 201a.

The incident-light adjusting member 205 may preferably be formed of a film having a thickness of 0.1 mm to 0.2 mm including the projections 205a, for example. Further, the projections 205a may be formed by photolithography, for example.

Further, distal end surfaces of the projections 205a of the incident-light adjusting member 205 may be brought into close contact with the light guide film 201a by, for example, as shown in FIG. 21, applying an optical adhesive agent 206 to the distal end surfaces of the projections 205a and adhering the distal end surfaces of the projections 205a on the film surfaces of the light guide film 201a.

Further, the projections 205a of the incident-light adjusting member 205 may be formed of columnar projections having curved bottom surfaces as shown in FIG. 19, for example. Further, the projections 205a of the incident-light adjusting member 205 may, for example, as shown in FIG. 20, have side surfaces thereof on a side opposite to the radiation region IR formed into a convex curved shape.

Further, in the backlight shown in the embodiment 5, it is preferable to provide a reflective sheet 207 which is overlapped to the incident-light adjusting member 205 to a surface of the light guide film 201a to which the light semi-transmissive film 201b is provided.

Figure 22:
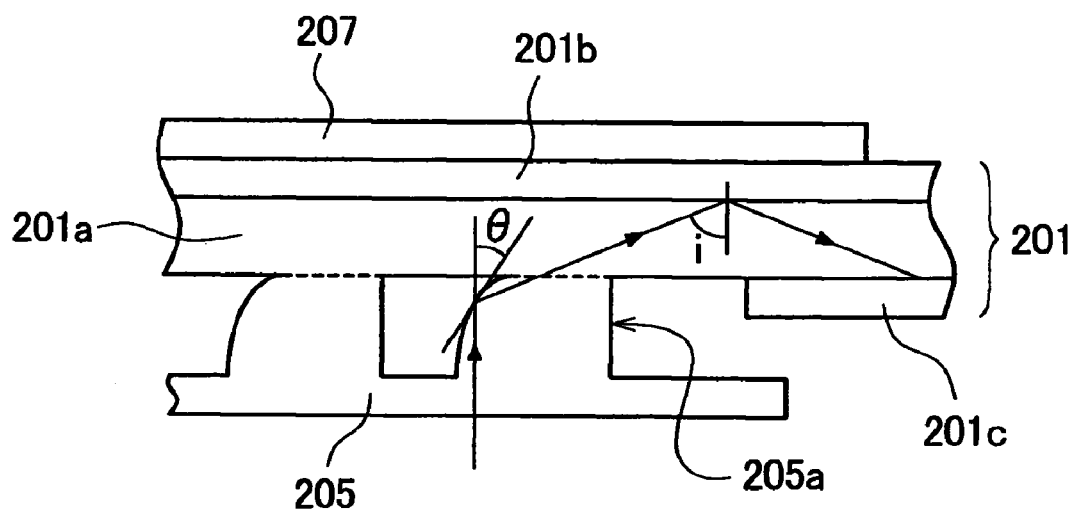
FIG. 22 is a schematic view for explaining the manner of operation of the backlight of the embodiment 5.

FIG. 22 is a schematic view for explaining the manner of operation of the backlight of the embodiment 5.

The manner of operation of the backlight of the embodiment 5 is explained in conjunction with FIG. 22. Here, FIG. 22 is an enlarged cross-sectional view of a region AR1 shown in FIG. 20.

In the backlight of the embodiment 5, a spot light source 202 such as the LED is, as shown in FIG. 20, arranged such that the spot light source 202 radiates light in the direction perpendicular to the film surface of the light guide film 201a. Accordingly, in such a state, a light from the spot light source 202 exhibits a small incident angle with respect to the light guide film 201a and hence, it is impossible to make the incident light 4 propagate into the radiation region IR. Accordingly, between the spot light source 202 and the light guide film 201a, the incident-light adjusting member 205 having the projections 205a shown in FIG. 22 is interposed. Here, the light 4 which is radiated in the direction perpendicular to the film surface of the light guide film 201a is, for example, as shown in FIG. 22, reflected on the convex curved surfaces of the projections 205a of the incident-light adjusting member 205 on a side opposite to the radiation region IR thus changing an advancing path thereof and, thereafter, the light 4 is incident on the light guide film 201a. The manner in which the incident light propagates through the light guide film 201a is exactly as same as the manner of propagation of the incident light explained in conjunction with the embodiment 1 to embodiment 3 and hence, the detailed explanation is omitted.

Here, the convex curved surface of the projection 205a of the incident-light adjusting member 205 adopts a shape which allows a reflection angle θ of the light on the convex curved shape to satisfy a following formula (1).

$$\theta = i/2 > (\arcsin(1/n))/2 \quad (1)$$

Here, in the formula (1), "i" indicates an incident angle of the light on the interface between the light guide film 201a and the light semi-transmissive film 201b, and "n" indicates a refractive index of the incident-light adjusting member 205 and the light guide film 201a.

The light which is radiated from the spot light source 202 such as the LED exhibits the largest component in the direction perpendicular to the film surface of the light guide film 201a. However, by forming the light components other than the light component in the perpendicular direction to have the shape which satisfies the formula (1), it is possible to allow such light components to be effectively incident on the light guide film 201a.

Further, for example, among the light which is radiated in the direction perpendicular to the film surface of the light guide film 201a, there exists light which passes through a portion different from the convex curved shape of the projection 205a. In this case, the light is incident perpendicular to the film surface of the light guide film 201a and hence, the light is not reflected on the interface with the light semi-transmissive film 201b whereby the light passes through the light semi-transmissive film 201b. Accordingly, by providing a reflective sheet 207 to a region on the light semi-transmissive film 201b which is overlapped to the incident-light adjusting member 205, the light which passes through the light semi-transmissive film 201b is reflected on the reflective sheet 207 thus allowing the incidence of the light on the light guide film 201a again.

Figure 23:
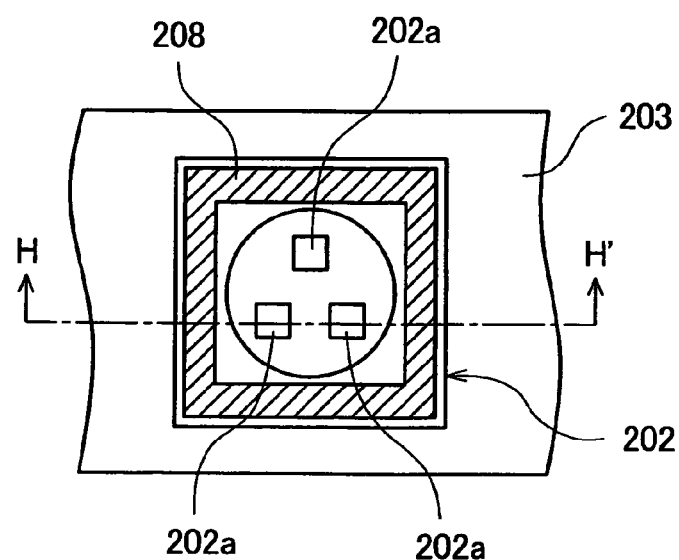
FIG. 23 is a schematic view showing one example of a method for adhering a spot light source and the incident-light adjusting member in the embodiment 5.

FIG. 23 is a schematic view showing one example of a method for adhering the spot light source and the incident-light adjusting member 205 in the embodiment 5. Further, FIG. 24 is a cross-sectional view taken along a line H-H' in FIG. 23.

Figure 24:
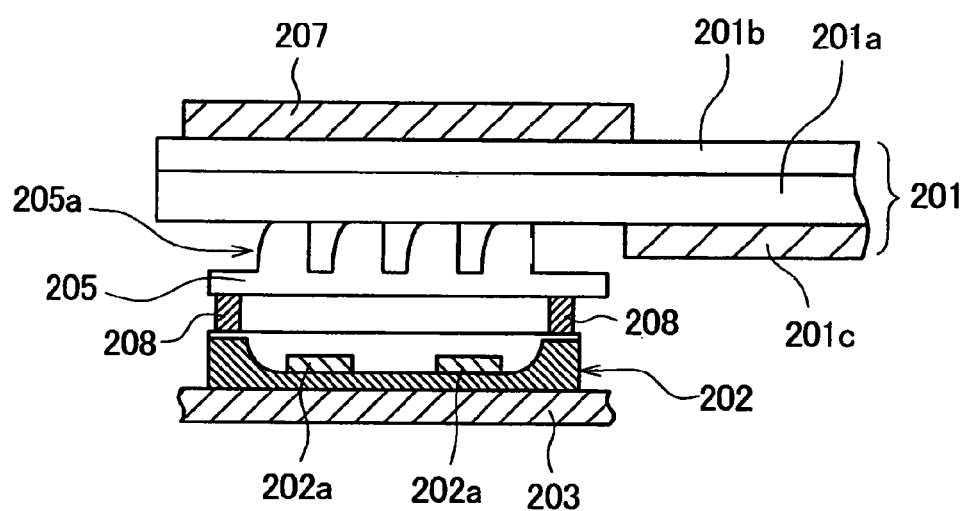
FIG. 24 is a cross-sectional view taken along a line H-H' in FIG. 23.

In the backlight of the embodiment 5, it is preferable to adhere the spot light source 202 such as the LED to the incident-light adjusting member 205 using an annular adhesive agent 208 as shown in FIG. 23 and FIG. 24, for example. Here, the annular adhesive agent 208 may be provided to an outermost periphery of a light radiation surface of the spot light source 202 for preventing the blocking of light from the light emitting element (LED chip) 202a which the spot light source 202 possesses.

Figure 25:
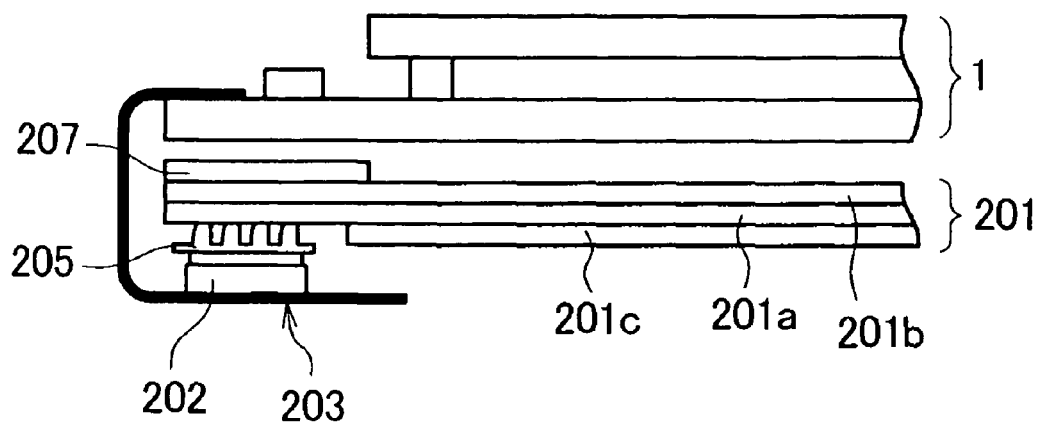
FIG. 25 is a schematic view showing one example of the arrangement of the backlight and the display panel of the embodiment 5.

FIG. 25 is a schematic view showing one example of the arrangement of the backlight and the display panel of the embodiment 5. Further, FIG. 26 is a schematic view showing another example of the arrangement of the backlight and the display panel of the embodiment 5.

In the backlight of the embodiment 5, for example, as shown in FIG. 20, the incident-light adjusting member 205 and the spot light source 202 are arranged on a surface side of the light guide film 201a on which the reflective film 201c is arranged. Here, the display panel 1 is arranged on a surface side of the light guide film 201a to which the light semi-transmissive film 201b is provided. Accordingly, as shown in FIG. 25, the spot light source 202 is arranged on the back surface of the light radiation portion 201 of the backlight.

By adopting such an arrangement, for example, it is also possible to arrange the incident-light adjusting member 205 such that the incident-light adjusting member 205 is overlapped to the display panel 1 partially or as a whole. Accordingly, a region of the display device outside the display region, so-called a picture frame region can be made small.

Figure 26:
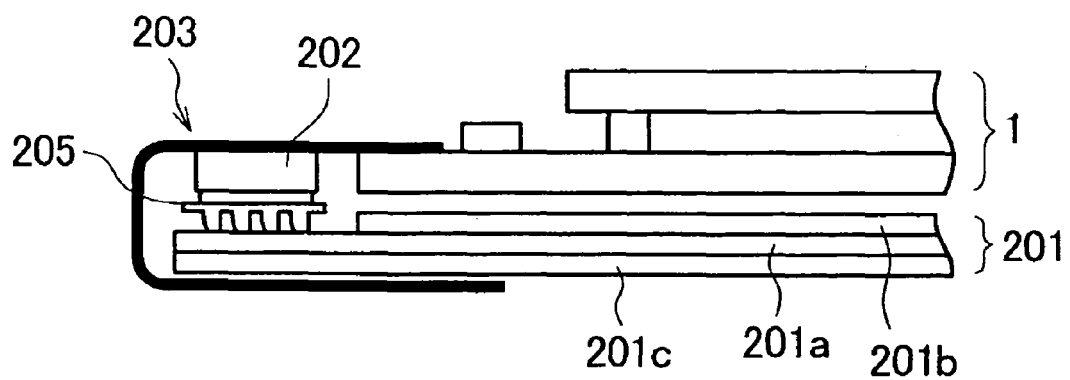
FIG. 26 is a schematic view showing another example of the arrangement of the backlight and the display panel of the embodiment 5.

Here, in the backlight of the embodiment 5, the spot light source 202 and the incident-light adjusting member 205 may be, for example, as shown in FIG. 26, arranged on a surface side of the light guide film 201a to which the light semi-transmissive film 201b is provided.

Figure 27:
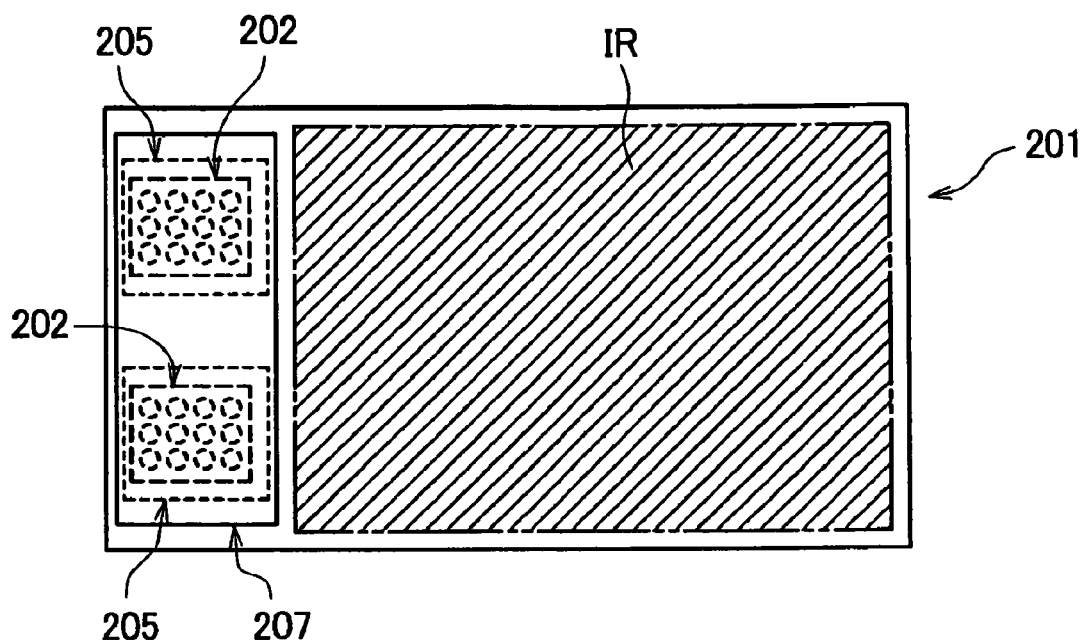
FIG. 27 is a schematic view for explaining a first variation of the embodiment 5.

FIG. 27 is a schematic view for explaining a first variation of the embodiment 5.

In explaining the constitution of the backlight of the embodiment 5, the case in which one spot light source 202 is arranged is exemplified as shown in FIG. 19, for example. However, the present invention is not limited to such backlight constitution and, for example, two spot light sources 202 may be arranged as shown in FIG. 27. Further, although not shown in the drawing, it is needless to say that three or more spot light sources 202 may be arranged.

Figure 28:
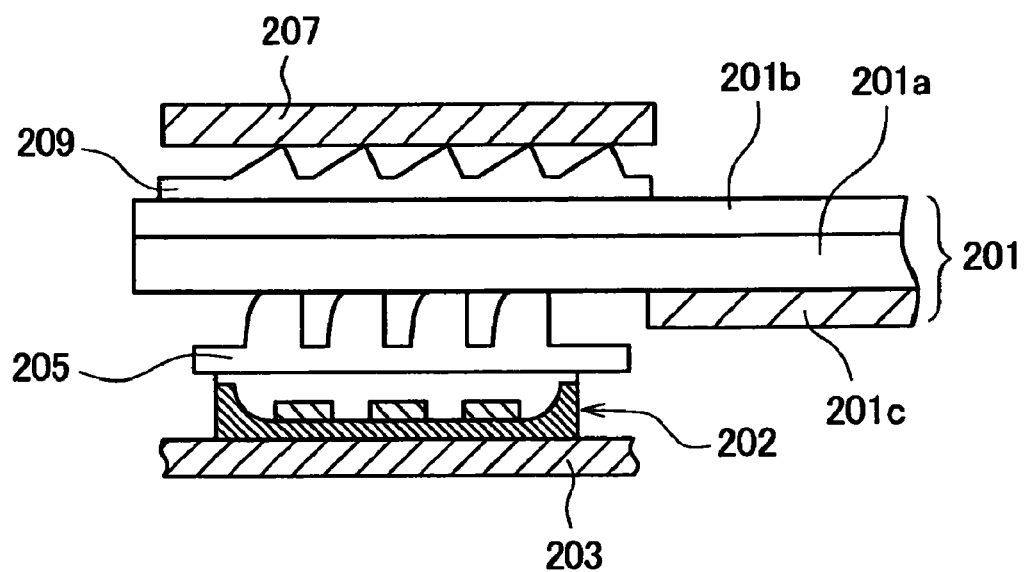
FIG. 28 is a schematic view for explaining a second variation of the embodiment 5.

FIG. 28 is a schematic view for explaining a second variation of the embodiment 5.

In explaining the constitution of the backlight of the embodiment 5, for example, as shown in FIG. 20, the case in which the reflective sheet 207 which is overlapped to the incident-light adjusting member 205 is adhered to the light semi-transmissive film 201b is exemplified. However, the present invention is not limited to the backlight constitution and, for example, as shown in FIG. 28, a prism sheet 209 may be arranged between the light semi-transmissive film 201b and the reflective sheet 207. By arranging the prism sheet 209 in such a manner, light which is reflected on the reflective sheet 207 after passing through the light semi-transmissive film 201b is allowed to be incident on the light guide film 201a again by setting a certain incident angle thus further enhancing the utilization efficiency of the light.

Further, although the explanation using drawings may be omitted, it is needless to say that the arrangement of the plurality of projections 205a of the incident-light adjusting member 205 is not limited to the arrangement in a matrix array as shown in FIG. 19, for example. With respect to the arrangement of the projections, it may be possible to adopt a method in which a plurality of projections 205a are arranged on curved lines which project in the direction toward the radiation region IR such as concentric circumferences about a certain point, for example.

Embodiment 6

Figure 29:
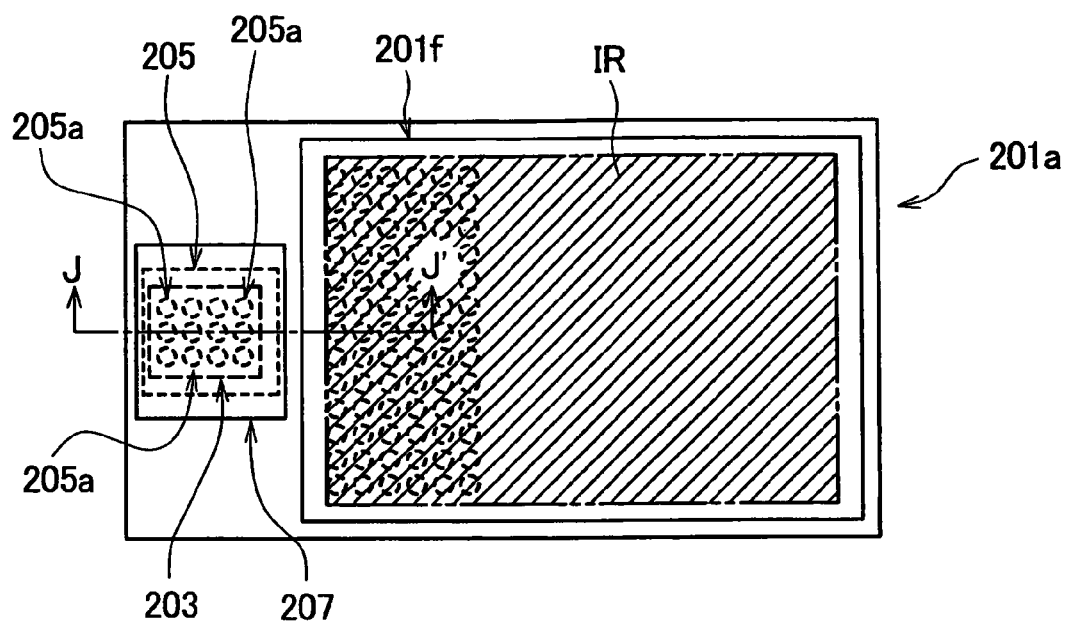
FIG. 29 is a schematic view showing the schematic constitution of a backlight of an embodiment 6 according to the present invention.

FIG. 29 is a schematic view showing the schematic constitution of a backlight of an embodiment 6 according to the present invention. Further, FIG. 30 is a cross-sectional view taken along a line J-J' in FIG. 29.

The backlight of the embodiment 6 is a backlight of another modification of the embodiment 5, wherein the constitution of the light source 202 and the vicinity of the light source 202 is equal to the corresponding constitution of the backlight of the embodiment 5. A point which makes this embodiment 6 different from 5 lies in the constitution of the radiation region IR of the light guide film 201a.

Figure 30:
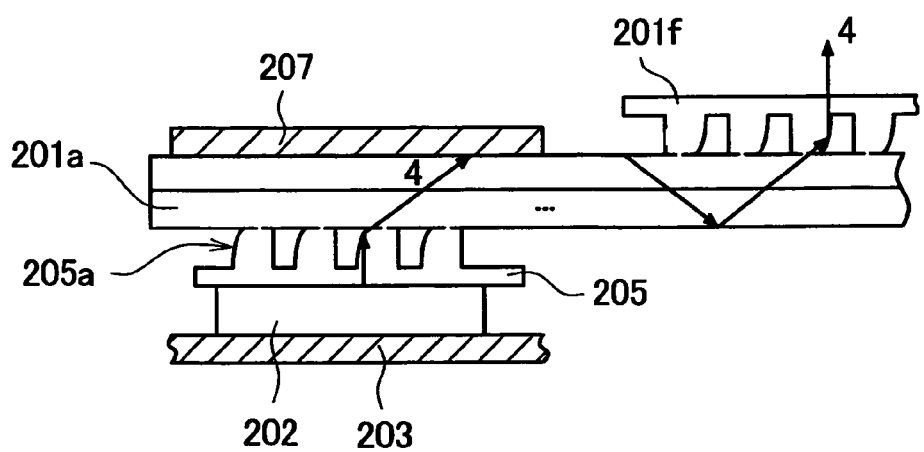
FIG. 30 is a cross-sectional view taken along a line J-J' in FIG. 29.

In the backlight of this embodiment 6, for example, as shown in FIG. 29 and FIG. 30, to a film surface of a light guide film 201a, a light semi-transmissive member 201b or a polarization reflective film 201d, and a reflective film 201c are not adhered. In place of such a constitution, a radiation-light adjusting member 201f is provided to one film surface of the light guide film 201a, that is, the surface of the light guide film 201a which faces the display panel 1 in an opposed manner. The radiation-light adjusting member 201f is a member which adjusts a radiation angle of the light which is radiated from the film surface of the light guide film 201a and is radiated to the display panel 1.

Further, the radiation-light adjusting member 201f has substantially the same constitution as the incident-light adjusting member 205, for example, wherein the radiation-light adjusting member 201f has one, two or more projections on a surface thereof which faces the light guide film 201a in an opposed manner, and distal-end surfaces of the projections are brought into contact with a film surface of the light guide film 201a. Here, although the projections are arranged only in a region close to the light source 202, in an actual arrangement, the projections similar to the projections shown in FIG. 29 and FIG. 30 are arranged over the whole region of the radiation-light adjusting member 201f. Here, the radiation-light adjusting member 201f may preferably be formed of a film having a thickness of 0.05 mm including the projections, for example. Further, the projections may be formed by photolithography, for example.

Further, distal end surfaces of the projections of the radiation-light adjusting member 201f may be brought into close contact with the light guide film 201a by, for example, applying an optical adhesive agent to the distal end surfaces of the projections and adhering the distal end surfaces of the projections on the film surfaces of the light guide film 201a.

Further, the projections of the radiation-light adjusting member 201f may be formed of columnar projections having curved bottom surfaces as shown in FIG. 29, for example. Further, the projections of the radiation-light adjusting member 201f may, for example, as shown in FIG. 30, have side surfaces thereof on a side opposite to the light source 202 formed into a convex curved shape.

Here, also in the backlight of the embodiment 6, a thickness of the light guide film 201a is set to 0.25 mm or less. Further, the light guide film 201a may be made of polycarbonate (PC) having a refractive index of 1.59.

The backlight of the embodiment 6 does not use the light semi-transmissive film 201b or the polarization reflective film 201d and the reflective member 201c. However, the refractive index of the light guide film 201a is larger than the refractive index of air and hence, the light 4 which is incident on the light guide film 201a after passing through the incident-light adjusting member 205 repeats the total reflection on the film surface, that is, on an interface between the light guide film 201a and air and propagates in the inside of the light guide film 201a.

Here, at portions where the projections of the radiation-light adjusting member 201f and the light guide film 201a are brought into contact with each other, the refractive index is substantially equal and hence, no total reflection occurs whereby the light 4 advances to the inside of the projections of the radiation-light adjusting member 201f directly. Then, the light 4 which enters the inside of the projections are reflected on the interfaces between the side surfaces of the projections and air and, thereafter, is radiated in the direction toward the display panel 1.

In this manner, according to the backlight of the embodiment 6, with the use of the radiation-light adjusting member 201f in place of the light semi-transmissive film 201b or the polarization reflective film 201d and the reflective film 201c, it is possible to obtain the advantageous effects substantially equal to the advantageous effects obtained by the backlight of the embodiment 5. Accordingly, it is possible to decrease kinds of sheets (films) which are adhered to the light guide film 201a and hence, the light guide film 201a can reduce the thickness thereof thus realizing the backlight at a low cost.

Although the present invention has been specifically explained in conjunction with the embodiments, it is needless to say that the present invention is not limited to the above-mentioned embodiments and various modifications are conceivable without departing from the gist of the present invention.

The backlights which have been explained in conjunction with respective embodiments are thin and light-weighted and, at the same time, exhibit high brightness uniformity of the radiation surface. Accordingly, the constitutions of the backlights which are exemplified in the respective embodiments may not be limited to the light source of the display device such as the liquid crystal display device and may be applicable to a planar light source device (unit) such as illumination equipment, for example.

What is claimed is:

1. A planar light source device comprising:
    a light source; and
    a film-like light guide member, wherein
    the light source includes a film-like incident-light adjusting member which is arranged in the direction at which light is radiated in the direction perpendicular to a film surface of the light guide member, and changes the incident direction of light to the light guide member in the propagation direction of light in the light guide member between a region on which the light is incident and a surface to which light of the light source is radiated, and
    the incident-light adjusting member has one, two or more projections on a surface side which faces the light guide member in an opposed manner, and distal end surfaces of the projections are brought into close contact with the light guide member.

2. A planar light source device according to claim 1, wherein a radiation-light adjusting member is provided to a radiation surface of the light guide member the radiation-light adjusting member adjusting a radiation angle of the light from the radiation surface.

3. A planar light source device according to claim 2, wherein a reflective member is provided to a back surface of the light guide member opposite to a surface on which the incident-light adjusting member is arranged and to a region which is overlapped to the incident-light adjusting member.

4. A planar light source device according to claim 2, wherein a projection of the incident-light adjusting member is a columnar projection having a curved bottom surface.

* * * * *